(12) United States Patent
Cole et al.

(10) Patent No.: US 8,068,742 B2
(45) Date of Patent: Nov. 29, 2011

(54) PHASE SHIFT KEYED MODULATION OF OPTICAL SIGNAL USING CHIRP MANAGED LASER

(75) Inventors: Christopher R. Cole, Redwood City, CA (US); Daniel Mahgerefteh, Palo Alto, CA (US); The'Linh Nguyen, San Jose, CA (US); Andrew C. Singer, Champaign, IL (US); Naresh Ramnath Shanbhag, Champaign, IL (US)

(73) Assignee: Finisar Corporation, Sunnyvale, CA (US)

( * ) Notice: Subject to any disclaimer, the term of this patent is extended or adjusted under 35 U.S.C. 154(b) by 810 days.

(21) Appl. No.: 12/171,201

(22) Filed: Jul. 10, 2008

(65) Prior Publication Data

US 2010/0008679 A1 Jan. 14, 2010

(51) Int. Cl.
 *H04B 10/00* (2006.01)
(52) U.S. Cl. ........ 398/152; 398/141; 398/139; 398/184; 398/205
(58) Field of Classification Search .................. 398/139, 398/140, 141, 152, 184, 202–205
 See application file for complete search history.

(56) References Cited

U.S. PATENT DOCUMENTS

| | | | | |
|---|---|---|---|---|
| 4,878,726 A * | 11/1989 | Fatehi | ............................... | 385/16 |
| 4,959,826 A * | 9/1990 | Smith | ............................... | 398/90 |
| 5,170,402 A * | 12/1992 | Ogita et al. | .................... | 372/20 |
| 5,325,382 A * | 6/1994 | Emura et al. | .................... | 372/26 |
| 5,999,300 A * | 12/1999 | Davies et al. | ................. | 398/185 |
| 6,341,023 B1 * | 1/2002 | Puc | ................................. | 398/79 |
| 6,559,994 B1 * | 5/2003 | Chen et al. | ..................... | 398/182 |
| 7,187,821 B2 * | 3/2007 | Matsui et al. | .................... | 385/24 |
| 7,286,572 B2 * | 10/2007 | Hornbuckle et al. | ......... | 370/537 |
| 7,321,734 B2 * | 1/2008 | Roberts et al. | ................ | 398/193 |
| 7,356,264 B2 * | 4/2008 | Mahgerefteh et al. | ........ | 398/193 |
| 7,433,604 B1 * | 10/2008 | Kim et al. | ...................... | 398/188 |
| 7,474,859 B2 * | 1/2009 | Mahgerefteh et al. | ........ | 398/201 |
| 7,502,567 B2 * | 3/2009 | Ranganath | ..................... | 398/183 |
| 7,680,420 B1 * | 3/2010 | Walker et al. | ................. | 398/183 |
| 7,848,661 B2 * | 12/2010 | Iannelli | .......................... | 398/197 |
| 7,860,402 B2 * | 12/2010 | Tian et al. | ..................... | 398/188 |
| 7,881,618 B2 * | 2/2011 | Yan et al. | ...................... | 398/185 |
| 7,912,378 B2 * | 3/2011 | Tian et al. | ..................... | 398/185 |
| 7,941,058 B2 * | 5/2011 | Ohm et al. | ..................... | 398/202 |

(Continued)

OTHER PUBLICATIONS

Tokle, Torger et al., Advanced Modulation Formats for Transmission Systems, Optical Fiber Communication/National Fiber Optic Engineers Conference, Feb. 24-28, 2008, 3 pages, San Diego, CA.

(Continued)

*Primary Examiner* — Agustin Bello
(74) *Attorney, Agent, or Firm* — Maschoff Gilmore & Israelsen

(57) ABSTRACT

A high-speed optical transmitter comprises multiple digital lanes that are provided to a bank of digital-to-analog converters. The analog signals are then used to Phase Shift Keyed (PSK) modulation using a Chirp Managed Laser (CML)-based transmitter, and potentially using dual polarization. A corresponding optical receiver receives the sequence of optical signals at a demodulator. For each polarization, the demodulator includes a corresponding demodulation channel that is configured to demodulate that polarization component of the optical signal into one or more signal components. Each of these signal components is converted into a corresponding digital signal using a corresponding analog-to-digital converter. In the case of higher-order PSK modulation (e.g., 8PSK or higher), for each polarization, the analog converter has a lower sampling rate than for QPSK modulation.

26 Claims, 21 Drawing Sheets

U.S. PATENT DOCUMENTS

| | | | |
|---|---|---|---|
| 7,962,045 B2* | 6/2011 | McCallion et al. | 398/193 |
| 2004/0028418 A1* | 2/2004 | Kaplan et al. | 398/188 |
| 2005/0271394 A1* | 12/2005 | Whiteaway et al. | 398/188 |
| 2006/0013590 A1* | 1/2006 | Hueda et al. | 398/149 |
| 2007/0274731 A1* | 11/2007 | Boffi et al. | 398/188 |
| 2008/0193145 A1* | 8/2008 | Yokoyama | 398/200 |
| 2008/0240729 A1* | 10/2008 | Toyoda et al. | 398/163 |
| 2008/0247763 A1* | 10/2008 | Mahgerefteh et al. | 398/140 |
| 2009/0003842 A1* | 1/2009 | Mahgerefteh et al. | 398/187 |
| 2009/0003843 A1* | 1/2009 | Oomori | 398/197 |
| 2009/0074407 A1* | 3/2009 | Hornbuckle et al. | 398/43 |
| 2009/0169213 A1* | 7/2009 | Lowery et al. | 398/98 |
| 2009/0279891 A1* | 11/2009 | Yu | 398/65 |
| 2009/0324253 A1* | 12/2009 | Winzer | 398/185 |
| 2010/0008679 A1* | 1/2010 | Cole et al. | 398/185 |
| 2010/0086314 A1* | 4/2010 | Yu et al. | 398/188 |
| 2011/0129230 A1* | 6/2011 | Zanoni et al. | 398/140 |

OTHER PUBLICATIONS

Kikuchi, Nobuhiko, et al., Experimental Demonstration of Incoherent Optical Multilevel Staggered-APSK (Amplitude-and Phase-Shift Keying) Signaling, Optical Fiber Communication/National Fiber Optic Engineers Conference, Feb. 24-28, 2008, 3 pages, San Diego, CA.

Freund, R. et al., 30Gbit/s RZ-8-PSK Transmission over 2800km Standard Single Mode Fibre without Inline Dispersion Compensation, Presentation, Optical Fiber Communication/National Fiber Optic Engineers Conference, Feb. 24-28, 2008, 3 pages, San Diego, CA.

Sekine, Kenro, et al., Advanced Multi-level Transmission Systems, Optical Fiber Communication/National Fiber Optic Engineers Conference, Feb. 24-28, 2008, 3 pages, San Diego, CA.

Proposal and feasibility study of a 6-level PSK modulation format based system for 100-Gb/s migration Kiyoshi Fukuchi, 2007, 3 Pages.

30 Gbit/s RZ-8-PSK Transmission over 2800 km Standard Single Mode Fibre without Inline Dispersion Compensation Ronald Freund, Dirk-Daniel Gross, Matthias Seimetz, Lutz Molle, Christoph Caspar, 2007, 3 Pages.

* cited by examiner

PHASE SHIFT KEYED MODULATION OF OPTICAL SIGNAL USING CHIRP MANAGED LASER

BACKGROUND OF THE INVENTION

Communication technology has transformed our world. As the amount of information communicated over networks has increased, high speed transmission has become ever more critical. High speed communications often rely on the presence of high bandwidth capacity links between network nodes. For optical links, a transceiver module at one network node converts electrical data into optical data for transmission on the optical channel. At the other network node, another transceiver module receives the optical signal, and converts the signal into an electrical signal. Transceivers are equipped with transmit and receive channels, such that bi-directional communication is possible.

Presently, standards are being developed for optical links at a staggering speed of 100 Gigabits per second (sometimes abbreviated as "100 G"). In fact, the Institute for Electrical and Electronics Engineers, Inc. (often referred to as "IEEE" for short), a leading professional association in the art of networking technologies, has recently voted that the next generation of Ethernet technology will be 100 Gigabit Ethernet as well as some support for 40 Gigabit Ethernet, and has established several task forces to develop appropriate standards that are yet under development.

Currently, 100 G Single Mode Fiber (SMF) and Multi Mode Fiber (MMF) standards for Ethernet optical link applications are under development. In general, however, on the transmit side, it is presently contemplated that such high speed transmitters will include a Media Access Control (MAC) component that provides data electrically to an optical transmitter. However, since 100 Gigabits per second is simply too fast for present Complementary Metal Oxide Semiconductor (CMOS) electrical I/O technology, the 100 Gigabits of electrical data will be provided in several independent electrical lanes.

For instance, perhaps 10 lanes of 10 Gigabits per second of data will be provided from the MAC component to the transmitter. If there were additional overhead used for encoding or error correction, perhaps the data rate for each lane may be increased and/or the number of lanes may be increased. For instance, 66B/64B encoding has been contemplated as being used to encode each lane of 10 Gigabits of second. This would result in each of the 10 lanes of electrical traffic being at an actually data rate of 10.3125 Gigabits per second.

In the transmitter, the 10 lanes of electrical traffic are serialized down to perhaps 4 lanes of optical data, each at a data rate of 25.78125 Gigabits per second, which includes the overhead for 66B/64B encoding. These 4 lanes of optics may then be multiplexed onto a signal fiber using Wavelength Division Multiplexing (WDM).

Ethernet data may be transported over longer distances by Dense Wavelength Division Multiplexing (DWDM) systems. Currently, standards are under development for defining the use of DWDM technology for transporting 100 G Ethernet data. The standard is referred to as OTU4 and encapsulates the Ethernet data in a payload which is then Forward Error Correction (FEC) encoded. The resulting fiber data rate is approximately 112 Gigabits per second.

The system (hereinafter called the "100 G DWDM OTU4 system") is contemplated as including two primary components, a Forward Error Correction capable MAC layer (called herein after an OTU4/FEC processor) and a 100 G DWDM capable transponder. In each of the transmit and receiver channels, there are 11 lanes of 11 Gigabits per second that are communicated using the OIF SFI-S interface specification. There is an eleventh de-skew lane to align all 10 data lanes for serial data transmission.

One of the modulation technologies considered in this 100 G DWDM OTU4 system is Dual-Polarization Quadrature Phase-Shift Keying (called "DP-QPSK" for short). The 112 Gigabit per second data stream is contemplated to be divided into four 28 Gb/s data streams, and modulates both I and Q phases of the TE and TM polarization states of the optical carrier wavelength.

FIG. 1 illustrates a possible architecture of a 100 G DWDM OTU4 system 100. On the transmit side, the system 100 receives 11 lanes (labeled collectively 111) of 11 Gigabits per second data. One lane 111A is received into an SFI-S decoder 112, and the remaining 10 lanes are received into a 10:4 serializer 113. The SFI-S decoder 112 and the serializer 113 receive reference clock signal REF_CLK in order to maintain proper timing. The data is reduced to four lanes (labeled collectively 115) of 28 Gigabit per second data after being properly encoded using pre-coder 114. A two-channel DP-QPSK modulator 116 applies DP-QPSK modulation to the four lanes of data to thereby modulate all four lanes of data onto a single optical fiber 117. The modulation is accomplished by using both the TE polarization and TM polarization of the optical signal as orthogonal information transport mechanisms, and also by using the in-phase and quadrature-phase portions of each polarization.

On the receive side, a receive optical signal (at a 112 Gigabit per second data rate) is received from the optical fiber 121 into a two-channel demodulator 122. The received optical signal may be formulated by another network node in the same manner as the optical signal that was transmitted by transmitter 116. The two-channel demodulator 122 extracts four components of the optical signal as follows: 1) an in-phase portion of the signal that had TE polarization (labeled TE-I), 2) a quadrature-phase portion of the signal that had TE polarization (labeled TE-Q), 3) an in-phase portion of the signal that had TM polarization (labeled TM-I), and 4) a quadrature-phase portion of the signal that had TM polarization (labeled TM-Q). Each of the TE and TM polarizations has a bit rate of 56 Gigabits per second, and a symbol rate of 28 Gigasymbols per second, the symbols each representing two bits of information.

The four demodulated data signals TE-I, TE-Q, TM-I and TM-Q are then quantized by a bank of four Analog-to-Digital Converters (ADCs) 123. Each ADC quantizes the correspond demodulated data signal into an n1 bit digital signal, which is then provided to a two-channel baseband Digital Signal Processor (DSP) 124. A local oscillator control signal "LO Control" is provided by the DSP 124 to the demodulator 122 thereby enabling a coherent receiver architecture. The DSP 124 identifies a corresponding point in an IQ symbol constellation chart for each of the TE and TM polarizations, and outputs the corresponding 2 bit sequence for each. The bit sequences are decoded by the decoder 125, after which the 4:10 deserializer 126 and SFI-S encoder 127 deserializes the bits into 11 lanes (referenced collectively as 128) of SFI-S encoded data, each at approximately 11 Gigabits per second.

Each ADC in the ADC bank 123 meets the Nyquist sampling criteria, which specifies that in order to properly sample an analog signal at a particular frequency, the sampling rate should be at least twice the particular frequency. Here, Fadc is twice Baud sampling, although slower Fadc may suffice at the expense of additional complexity in the DSP 124. The optimal ADC quantization bit precision level (n1) depends on the required PMD tracking performance, and can for example be 5 bits (i.e., n1=5).

FIG. 2 illustrates a conventional conceptualization 200 for the two-channel DP-QPSK transmitter 116 of FIG. 1. There are two polarization branches in FIG. 2, a TE polarization branch represented by the upper circuitry, and a TM polarization branch represented by the lower circuitry. Portions of a Distributed FeedBack (DFB) laser signal 201 are fed into each polarization branch via the use of a power splitter 202.

As for the TE branch, the continuous waveform from the DFB is fed into a hybrid IQ circuit 211, which essentially causes a continuous in-phase waveform to be provided to an in-phase modulator 212A, and a 90 degree phase shifted version of the continuous waveform (i.e., a quadrature-phase waveform) to be provided to the quadrature-phase modulator 212B. A distinct 28 Gigabit per second signal is fed into each of the in-phase modulator 212A and the quadrature-phase modulator 212B causing appropriate phase shift keying of the optical signal. The in-phase and quadrature-phase keyed optical signals are then summed using optical summer 213.

The TM branch includes hybrid IQ circuit 221, in-phase modulator 222A, quadrature-phase modulator 222B, and summer 223, which may essentially be the same as the respective components 211, 212A, 212B, and 213 of the TE branch. However, the TM branch receives its own distinct pair of 28 Gigabits per second signals for appropriate phase shift keying. In addition, a TE to TM rotator 224 is provided to represent the summed keyed optical signals using TM polarization. The TE polarized signal and the TM polarized signal are then summed using optical summer 203, after which the summed optical signal may then be transmitted onto an optical fiber.

FIG. 3 illustrates a resulting four symbol constellation IQ graph 300 that results from each of the TM polarization signal and the TE polarization signal. There are four symbol points shown in the IQ graph 300. When a particular signal is received for a certain polarization, the magnitude of the in-phase component and the quadrature phase component is calculated. Based on that information, the closest symbol point is selected from the IQ graph 300. The corresponding 2 bit symbol (herein m1 is equal to 2) is then output to the decoder 125. This is done for each of the TE and TM polarization signals.

FIG. 4 illustrates an example architecture 400 for the four-channel demodulator 122 of FIG. 1. The optical signal is received into the TE TM splitter 401, which provides the TE polarized portion of the optical signal to the I/Q hybrid mixer 411 to start the TE branch of demodulation. The TE TM splitter 401 also provides the TM polarized portion of the TE polarized optical signal to the TM to TE rotator 402, which rotates the polarization of that optical signal to TE polarization. That optical signal is provided to the I/Q hybrid mixer 421 to start the TM branch of modulation.

The TE and TM polarization optical signals are mixed in I/Q Hybrids 411 and 421 respectively with a continuous waveform signal provided by a DFB laser 402 via the power splitter 403 with the timing of the continuous waveform controlled by the LO Control signal. The resulting mixed signals are then provided to corresponding photo-receivers 412A, 412B, 422A and 422B. Each corresponding electrical signal is adjusted to a normalized level by respective Variable Gain Amplifiers (VGAs) 413A, 413B 423A and 423B, after which they are subjected to clock recovery 414A, 414B, 424A and 424B. The clock recovery elements 414A, 414B, 424A and 424B should be viewed as functional transformations only, since the clock recovery may be provided for all channels using a single clock recorder circuit. This results in signals TE-I, TE-Q, TM-I and TM-Q described in FIG. 1. The VGA and Clock Recovery performance is improved by using error signals derived in the two-channel Baseband DSP.

As previously mentioned, the conventional 100 G DWDM OTU4 system 100 of FIG. 1 uses DP-QPSK. In other words, as just explained, separate QPSK modulation is performed for both the TE polarization and TM polarization of the optical signal. The TE polarized and TM polarized signals are then optically summed for transport over the optical fiber.

Another term for QPSK modulation is 4PSK modulation, referring to the 4 point symbol constellation. The symbols are all the same amplitude and are spaced 90 degrees apart (see FIG. 3).

The next higher order modulation is 8PSK, and has an 8 point symbol constellation. The symbols are all the same amplitude (i.e., the points are equidistant from the origin of the IQ constellation plot) and are spaced 45 degrees apart. An example of 8PSK modulation system is Enhanced Data rates for GSM Evolution (EDGE) for sending high speed digital data over GSM wireless networks.

BRIEF SUMMARY

In accordance with embodiments described herein, an optical transmitter comprises an n-lane digital data channel, a bank of "n" digital-to-analog converters, and a Phase Shift Keyed (PSK) Chirp Managed Laser (CML)-based transmitter. The n-lane digital data channel provides a synchronized sequence of n-bit digital data signals, one n-bit digital data signal for each symbol in the sequence and each n-bit digital data signal having at least eight possible digital values, each corresponding to a distinct symbol. The n-bit digital-to-analog converter converts the sequence of n-bit digital data signals into a corresponding sequence of analog data signals. The PSK CML-based transmitter receives the sequence of analog data signals, and transmits a corresponding sequence of optical signals, each optical signal in the sequence representing a point on a PSK constellation plot. In one embodiment, such an optical signal is created for multiple polarizations (e.g., TE and TM), and then combined prior to transmission.

In the case of higher-order PSK modulation, the use of a CML-based transmitter significantly reduces the difficulty involved with performing higher order PSK modulation (such as 8PSK modulation and higher-order modulation). This is especially true at high bit rates such as 100 Gigabits per second and above.

A corresponding optical receiver receives the sequence of optical signals at a demodulator. As mentioned, the optical signal could have multiple polarization components. For each polarization, the demodulator includes a corresponding demodulation channel that is configured to demodulate that polarization component of the optical signal into "m" signal components (where "m" is any positive integer). Each of these m signal components is converted into a corresponding digital signal using a corresponding analog-to-digital converter.

In the case or higher-order PSK modulation of 8PSK or higher, each polarization portion of the received signal represents a symbol sequence in which each symbol has eight or more possible values. Accordingly, the sampling rate of the analog-to-digital converters may be significantly reduced as compared to the prior art 100 G DWDM OTU4 system described with respect to FIG. 1. For example, for 2× Baud sampling, the sampling frequency may be reduced from 56 Gigasamples per second to 37.3 Gigasamples for second if 8PSK is employed, and 28 Gigasamples per second if 16PSK is employed. For Baud sampling, the sampling frequency may be reduced from 28 Gigasamples per second to 18.7 Gigasamples for second if 8 PSK is employed, and 14 Gigasamples per second if 16PSK is employed.

Although the precision of the analog-to-digital converters should be increased due to a more congested IQ constellation graph associated with 8PSK or 16PSK modulation as compared to QPSK modulation, the sampling rate may be significantly reduced, thereby reducing the complexity in implementing the analog-to-digital converters, especially in a dual polarization system in which the PSK modulated optical signal bit rate is 100 Gigabits per second or above. Furthermore, the electrical communication from the analog-to-digital converters to the downstream digital signal processors is simplified due to a lower and more manageable electrical bit rate. Furthermore, the lower symbol rate in the optical signal requires lower spectral bandwidth, allowing the higher-order modulated optical signal to more easily fit into Dense Wavelength Division Multiplexing (DWDM) channels. For instance, even a 112 Gigabit per second optical signal might more easily fit into a 50 Gigahertz DWDM channel.

These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

A high-speed optical transmitter and receiver structure are described herein. The high-speed optical transmitter comprises multiple digital lanes that are provided to a bank of digital-to-analog converters. The analog signals are then used to perform complex Phase Shift Keyed (PSK) modulation using both the in-phase and quadrature phase modulations, using a Chirp Managed Laser (CML)-based transmitter, and potentially using dual polarization (e.g., using the TE polarization and the TM polarization). A corresponding optical receiver receives the sequence of optical signals at a demodulator. For each polarization, the demodulator includes a corresponding demodulation channel that is configured to demodulate that polarization component of the optical signal into one or more analog signal components. Each of these analog signal components is converted into a corresponding digital signal using a corresponding analog-to-digital converter. The use of a CML transmitter may significantly reduce the size and complexity of the transmitter. For higher-order modulation (e.g., 8PSK and above), for each polarization, the analog converter could have a lower sampling rate when compared to the bit rate. This lower sampling rate provides significant advantages, especially for optical signals that use dual polarization and which operate at 100 Gigabits per second and above.

Figure 5:
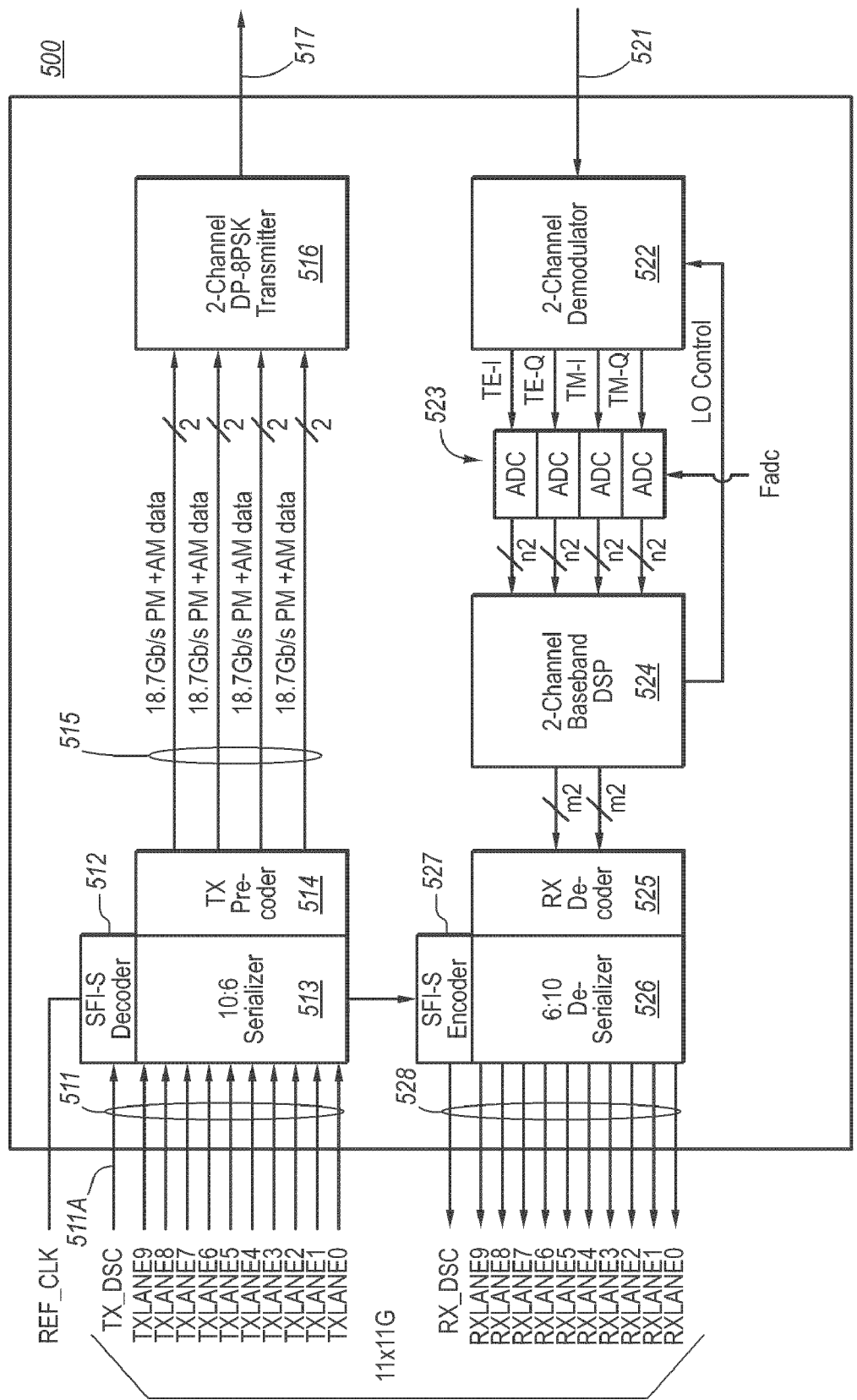
FIG. 5 illustrates an example 112 Gigabits per second transponder architecture.

Although the principles described herein may be used for 8PSK or even higher order PSK modulation, FIG. 5 illustrates an example 8PSK 112 Gigabits per second transponder architecture 500. That said, the principles described herein may be used for any complex modulation PSK, whether 8PSK, whether of higher order (e.g., 16PSK) or whether or lower order (QPSK). The principles described herein are not even limited to conventional constellation graphs. Thus, a 3PSK modulation (or perhaps a 5, 6, or 7 PSK constellation graph may also be used herein that uses in-phase and quadrature-phase modulation.

If higher-order PSK modulation (e.g., 5PSK and above) is employed, the higher-order modulation permits the sampling rate of the analog-to-digital converters in the receiver to be reduced, thereby permitting better electrical communication from the analog-to-digital converters to the Digital Signal Processor (DSP). The use of an 8PSK modulation, in particular, has design advantages in that it permits for relatively straightforward conversions from a symbol to a sequence of bits, and for more straightforward correlation between a particular signal and a correspondence symbol. Although the precision of the analog-to-digital converters may be increased to account for a more clustered distribution of symbol points on the IQ symbol constellation graph, the sampling rate of the analog-to-digital converters is significantly reduced, thereby reducing the complexity and increasing the feasibility of the analog-to-digital converters at high data rates of 100 Gigabits per second and faster. Also, the lower symbol rates associated with the higher order PSK modulation allows for the optical signal to more feasibly be implemented using Dense Wavelength Division Multiplexing (DWDM) technology. As will be explained hereinafter with respect to a more general example architecture, the specific architecture of FIG. 5 is simply an example only of a wide-variety of possible architectures that may employ the principles of the present invention.

Referring to FIG. 5, on the transmit side, the system 500 receives 11 lanes (labeled collectively 511) of 11 Gigabits per second data. The broader principles described herein are not, however, limited to the number of electrical data lanes received into the transmitter, nor to the actual data rate represented on the optical signal.

One lane 511A is received into an SFI-S decoder 512, and the remaining 10 lanes are received into a 10:6 serializer 513. The SFI-S decoder 512 and the serializer 513 receive reference clock signal REF_CLK in order to maintain proper timing. The data is reduced to six lanes of data (not shown) as output from the 10:6 serializer 513 to the pre-coder 514. Three lanes coherently represent a sequence of 3-bit values that are to be represented on a TE polarized optical signal using 8PSK modulation, and the other 3 lanes represent a sequence of 3-bit values that are to be represented on a TM polarized optical signal using 8PSK modulation. Of course, the principles described herein are not limited to 8PSK modulation, but also apply to higher modulations such as 16PSK and higher, and lower modulations such as QPSK and other modulations as previously discussed.

The pre-coder 514 uses the six lanes of data received from the 10:6 serializer 513 and creates 8 lanes of data (labeled collectively as 515) for providing to a two-channel DP-8PSK transmitter 516, which transmits the corresponding modulated signal on the optical fiber 517. These 8 data lanes include 4 Phase Modulation (PM) data lanes (two for each of the TE and TM polarizations), and 4 Amplitude Modulation (AM) data lanes (two for each of the TE and TM polarizations). If the optical signal data rate is 112 Gigabits per second, each of the 8 data lanes would actually have a bit rate of 18.7 Gigabits per second. Of course, 18.7 Gigabits per second times 8 is greater than 112 Gigabits per second. Accordingly, there is redundant information contained in the 8 data lanes 515 that enables separate PM and AM control.

Figure 1:
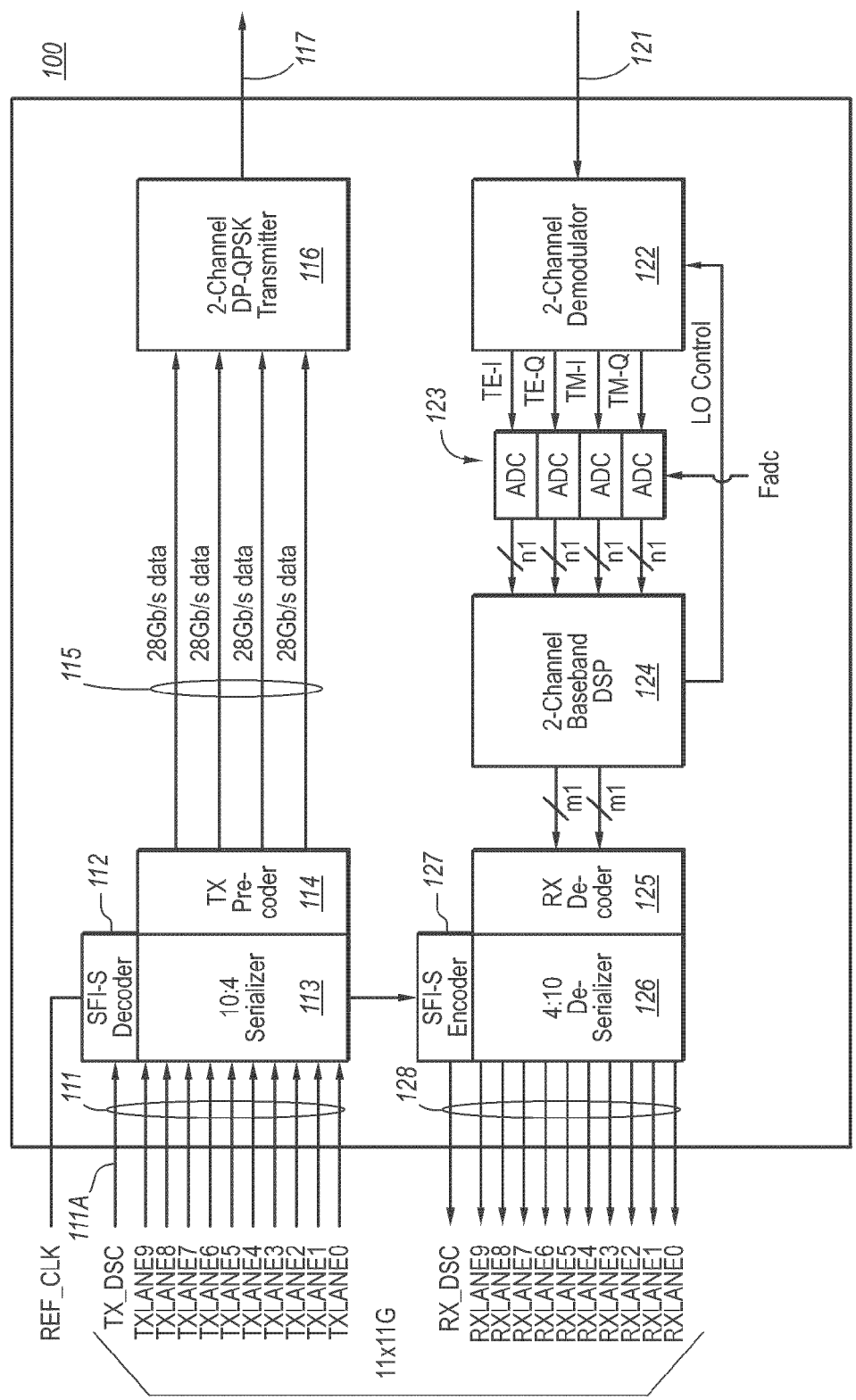
FIG. 1 schematically illustrates a possible architecture of a 100 G DWDM transponder system.

On the receiver, a two-channel demodulator 522 and a bank of four analog-to-digital converters 523 are provided. The two-channel demodulator 522 may be similar to the two-channel demodulator 122 of the system 100 of FIG. 1. Specifically, a receive optical signal (at a 112 Gigabit per second data rate in this example) is received from the optical fiber 521 into the two-channel demodulator 522. The two-channel demodulator 522 extracts four components of the optical signal as follows: 1) an in-phase portion of the signal that had TE polarization (labeled TE-I), 2) a quadrature-phase portion of the signal that had TE polarization (labeled TE-Q), 3) an in-phase portion of the signal that had TM polarization (labeled TM-I), and 4) a quadrature-phase portion of the signal that had TM polarization (labeled TM-Q). Each of the TE and TM polarizations has a bit rate of 56 Gigabits per second.

The four demodulated data signals TE-I, TE-Q, TM-I and TM-Q are then quantized by the bank of four Analog-to-Digital Converters (ADCs) 523. Here is where the receive channel starts to differ significantly from the system 100 of FIG. 1. The ADCs 523 can now run at a lower sampling rate as compared to 4PSK system, for example at 18.7 Gigasamples per second for Baud sampling. The ADC precision should higher for equivalent performance, so if 4PSK ADC is 5 bits (i.e., n1=5 in FIG. 1), the 8PSK ADC can be 6 or perhaps 7 bits. Accordingly, the value of n2 in FIG. 5 could be, for example, 6 or perhaps 7. As previously mentioned, this allows the ADC implementation to be more feasible, and facilitates DWDM modulation.

Each ADC quantized the correspond demodulated data signal into an n2 bit digital signal, which is then provided to a two-channel baseband Digital Signal Processor (DSP) 524. A local oscillator control signal "LO Control" is provided by the DSP 524 to the demodulator 522 thereby enabling a coherent receiver architecture. The DSP 524 identifies a corresponding point in an IQ symbol constellation chart for each of the TE and TM polarizations, and outputs the corresponding m2 bit sequence for each. With 8PSK modulation, m2 will be three. For 16PSK modulation, m2 would be four. The bit sequences are decoded by the decoder 525, after which the 6:10 deserializer 526 and SFI-S encoder 527 deserializes the bits into 11 lanes (referenced collectively as 528) of SFI-S encoded data, each at approximately 11 Gigabits per second.

Figure 6:
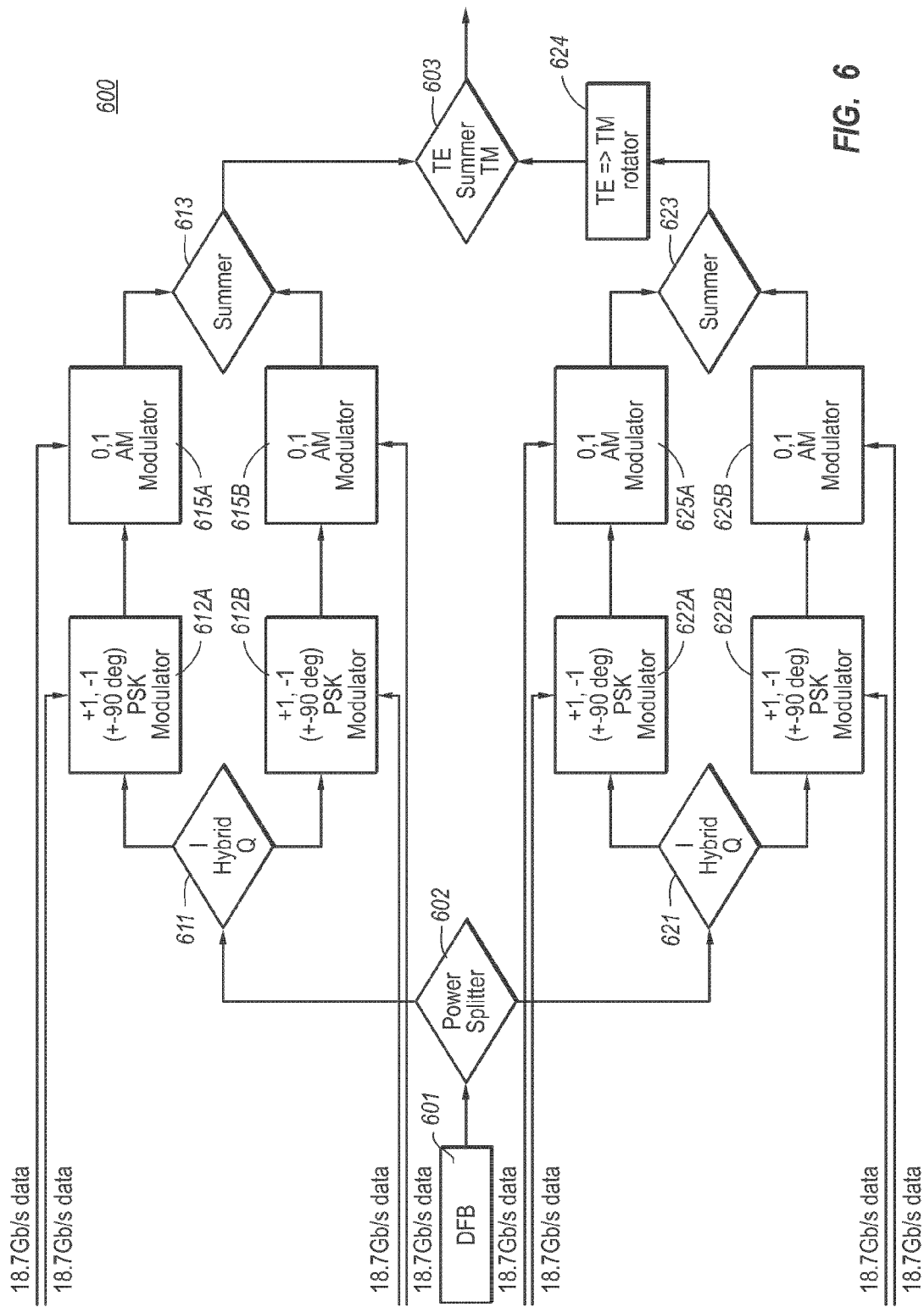
FIG. 6 illustrates an example four-channel DP-8PSK transmitter that may represent an example of the transmitter of FIG. 5.

FIG. 6 illustrates an example two-channel DP-8PSK transmitter 600 that may represent an example of the transmitter 516 of FIG. 5. There are two polarization branches in FIG. 6, a TE polarization branch represented by the upper circuitry, and a TM polarization branch represented by the lower circuitry. Portions of a Distributed FeedBack (DFB) laser signal 601 are fed into each polarization branch via the use of a power splitter 602.

As for the TE branch, the continuous waveform from the DFB is fed into a hybrid IQ circuit 611, which essentially causes a continuous in-phase waveform to be provided to an in-phase modulator 612A, and a 90 degree phase shifted version of the continuous waveform (i.e., a quadrature-phase waveform) to be provided to the quadrature-phase modulator 612B. A distinct 18.7 Gigabit per second PM signal is fed into each of the in-phase modulator 612A and the quadrature-phase modulator 612B causing appropriate phase shift keying of the optical signal.

Figure 2:
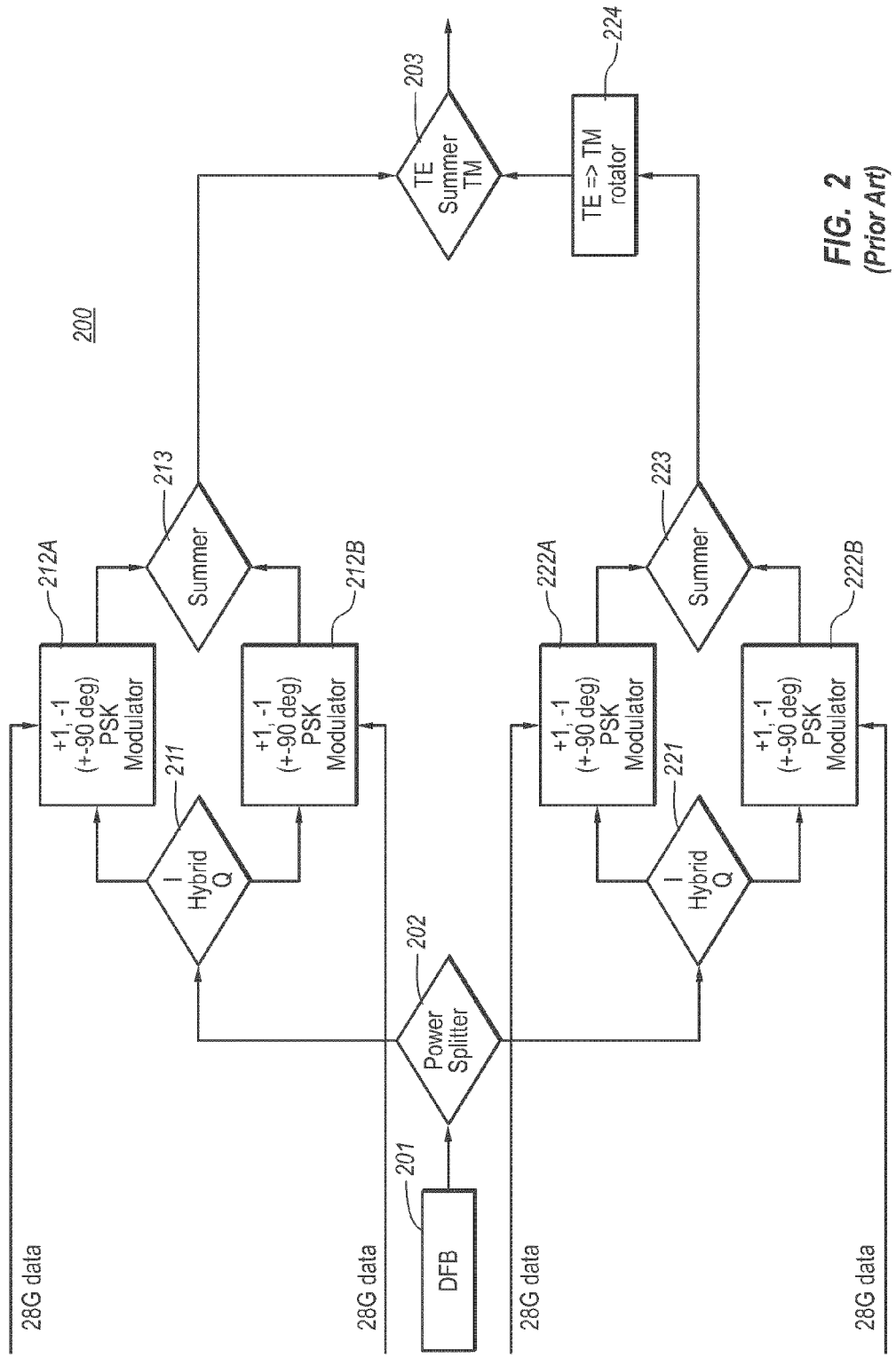
FIG. 2 illustrates a conventional conceptualization for the four-channel DP-QPSK transmitter of FIG. 1.

The TM branch includes hybrid IQ circuit 621, in-phase modulator 622A, and quadrature-phase modulator 622B, which may essentially be the same as the components 611, 612A and 612B of the TE branch. However, the TM branch receives its own distinct pair of 18.7 Gigabits per second signals for appropriate phase shift keying. The components 601, 611, 612A, 612B, 622A and 622B may be similar in structure and operation as the components 201, 211, 212A, 212B, 222A and 222B of the QPSK transmitter 200 of FIG. 2, except that the mixing occurs at 18.7 Gigahertz, rather than 28 Gigahertz.

In addition, the results from the PM modulation from PM modulators 612A, 612B, 622A and 622B are provided to AM modulators 615A, 615B, 625A and 625B which zero out the signal, or allow the signal to pass, depending on the corresponding AM data. Only after the AM modulation are the signals then summed using summer 613 for the TE polarization and summer 623 for the TM polarization.

In the TM branch, TE to TM rotator 224 is provided to represent the summed keyed optical signals using TM polarization. The TE polarized signal and the TM polarized signal are then summed using optical summer 603, after which the summed optical signal may then be transmitted onto an optical fiber.

Figure 7:
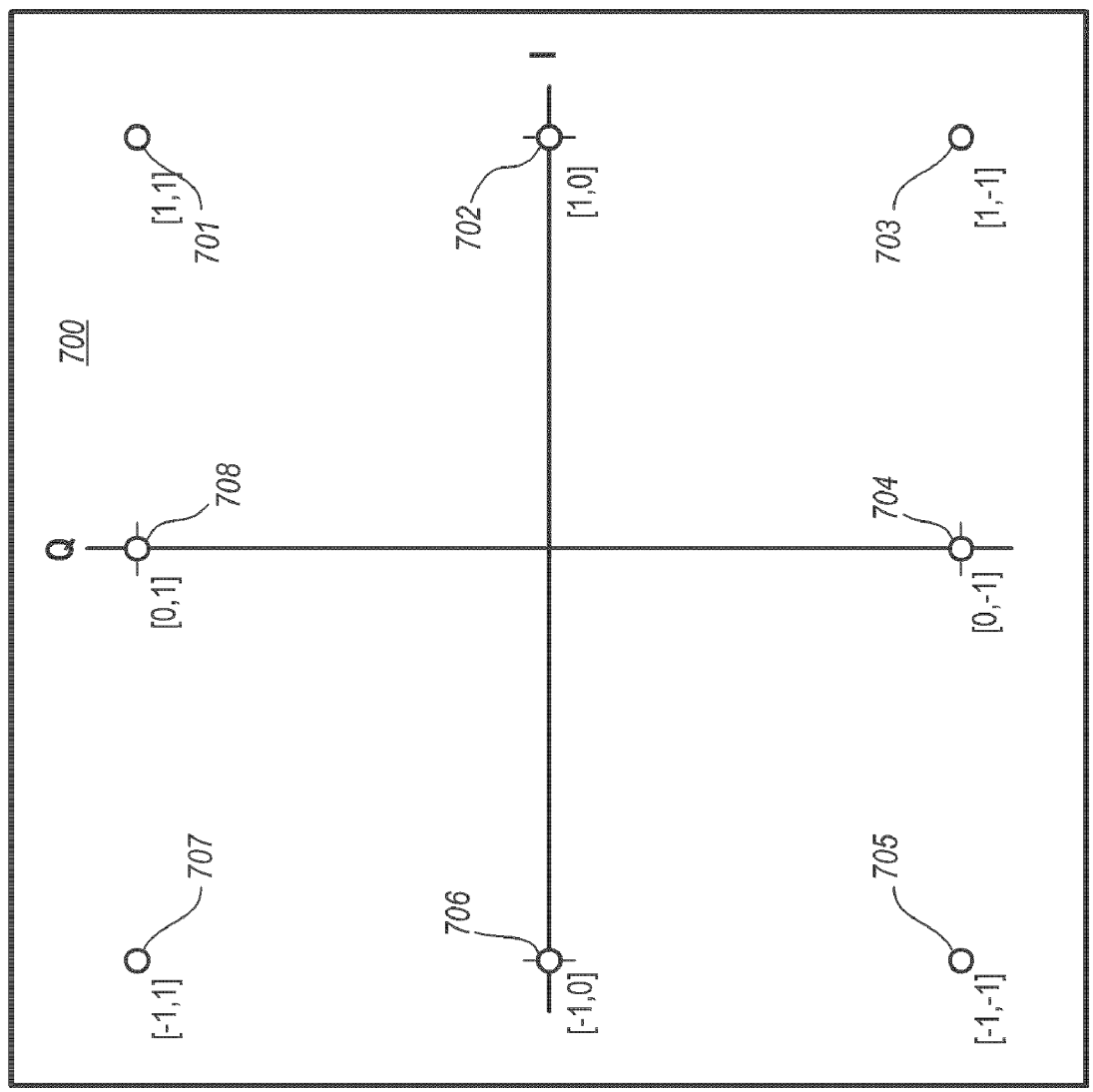
FIG. 7 illustrates the eight symbol constellation as plotted on an IQ constellation graph that results from the transmitter of FIG. 6.

FIG. 7 illustrates the resulting 8 symbol constellation as plotted on an IQ graph 700. Note that now there are eight symbol points 701 through 708. In this case, however, not all of the symbols are the same amplitude (as measured by each of the point's distance from the origin). For instance, points 702, 704, 706 and 708 have a normalized amplitude of 1, whereas points 701, 703, 705 and 707 have a normalized amplitude of the square root of 2, which represents a power difference of approximately 3 dB.

Figure 8:
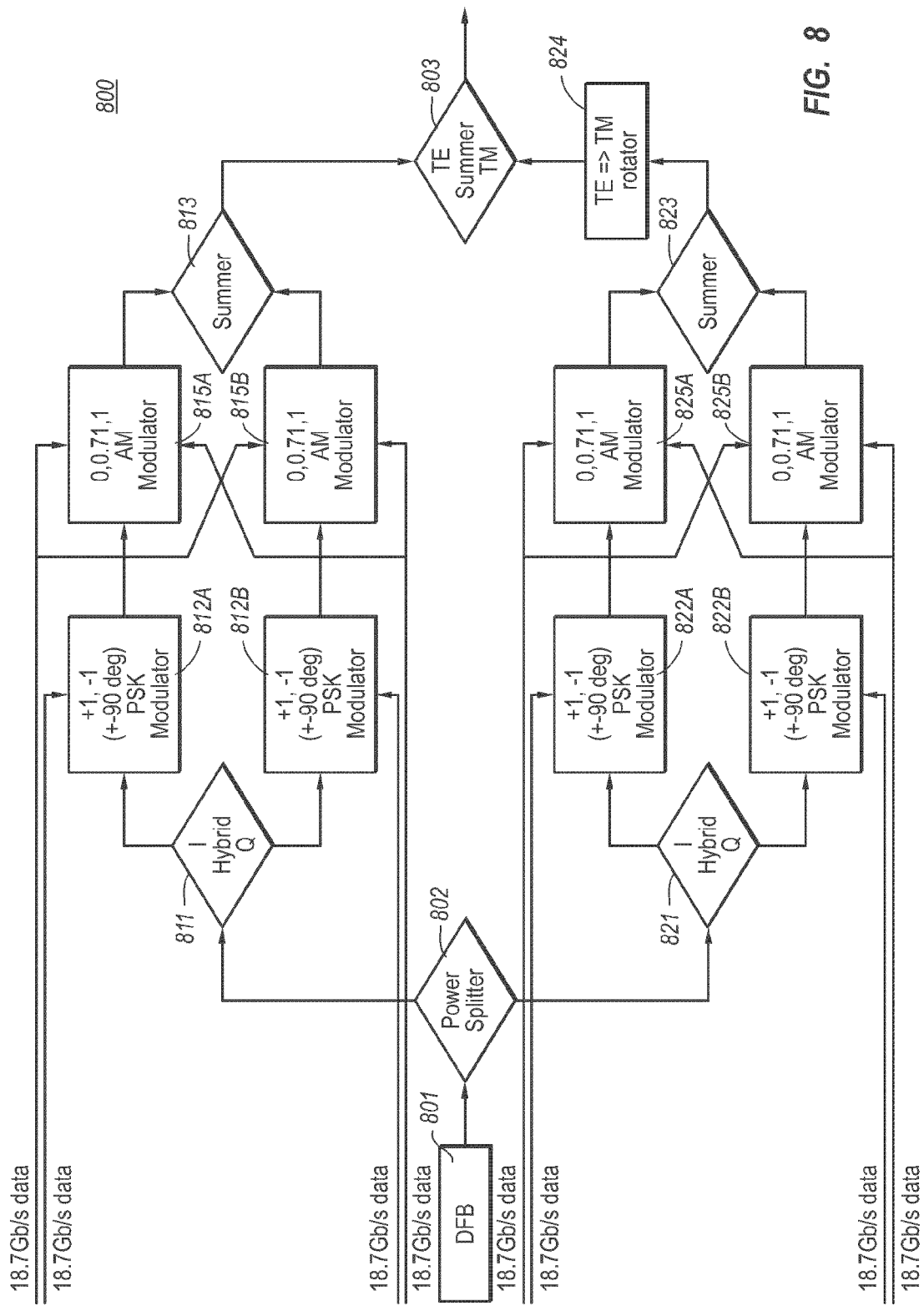
FIG. 8 illustrates a more complex 8PSK transmitter architecture that permits a constant amplitude in the point symbols.

FIG. 8 illustrates a more complex 8PSK transmitter architecture 800 that permits a constant amplitude in the point symbols, thereby even further improving the effectiveness of the 8PSK modulation. The 8PSK transmitter architecture 800 is somewhat more complicated that the 8PSK transmitter architecture 600.

The Phase Modulation (PM) modulation portion of the transmitter architecture 800 is similar to the PM modulation portion of the transmitter 600. Specifically, once again, there are two polarization branches in FIG. 8, a TE polarization branch represented by the upper circuitry, and a TM polarization branch represented by the lower circuitry. Portions of a Distributed FeedBack (DFB) laser signal 801 are fed into each polarization branch via the use of a power splitter 802.

As for the TE branch, the continuous waveform from the DFB is fed into a hybrid IQ circuit 811, which essentially causes a continuous in-phase waveform to be provided to an in-phase modulator 812A, and a 90 degree phase shifted version of the continuous waveform (i.e., a quadrature-phase waveform) to be provided to the quadrature-phase modulator 812B. A distinct 18.7 Gigabit per second PM signal is fed into each of the in-phase modulator 812A and the quadrature-phase modulator 812B causing appropriate phase shift keying of the optical signal.

The TM branch includes hybrid IQ circuit 821, in-phase modulator 822A, and quadrature-phase modulator 822B, which may essentially be the same as the components 811, 812A and 812B of the TE branch. However, the TM branch receives its own distinct pair of 18.7 Gigabits per second signals for appropriate phase shift keying. The components 801, 811, 812A, 812B, 822A and 822B may be similar to the components 601, 611, 612A, 612B, 622A and 622B, respectively, of FIG. 6.

The AM modulators 815A, 815B, 825A and 825B now have three possible outputs, a zero output in which the output signal is zero regardless of the input signal, a one output in which the input signal is permitted to pass as the output signal, and a 0.71 output level in which the input signal is permitted to pass as the output signal with some attenuation (about 3 dB). When both the in-phase and quadrature phase AM data are at a "1" level for a particular polarization, both of the AM modulators for that polarization output the 0.71 output level. When either the in-phase or quadrature-phase AM data is at a "1" level and the other is at a "0" level for a particular polarization, the AM modulator with the "1" data outputs a 1 amplitude signal and the other AM Modulator with the "0" data outputs a 0 amplitude signal.

Only after the AM modulation by AM modulators 815A, 815B, 825A and 825B are the signals then summed using summer 813 for the TE polarization and summer 823 for the TM polarization. In the TM branch, the TE to TM rotator 824 is provided to represent the summed keyed optical signals using TM polarization. The TE polarized signal and the TM polarized signal are then summed using optical summer 803, after which the summed optical signal may then be transmitted onto an optical fiber. The components 803, 813, 823 and 824 may be similar to the respective components 603, 613, 623 and 624 of FIG. 6, and respective components 203, 213, 223 and 224 of FIG. 2.

Figure 3:
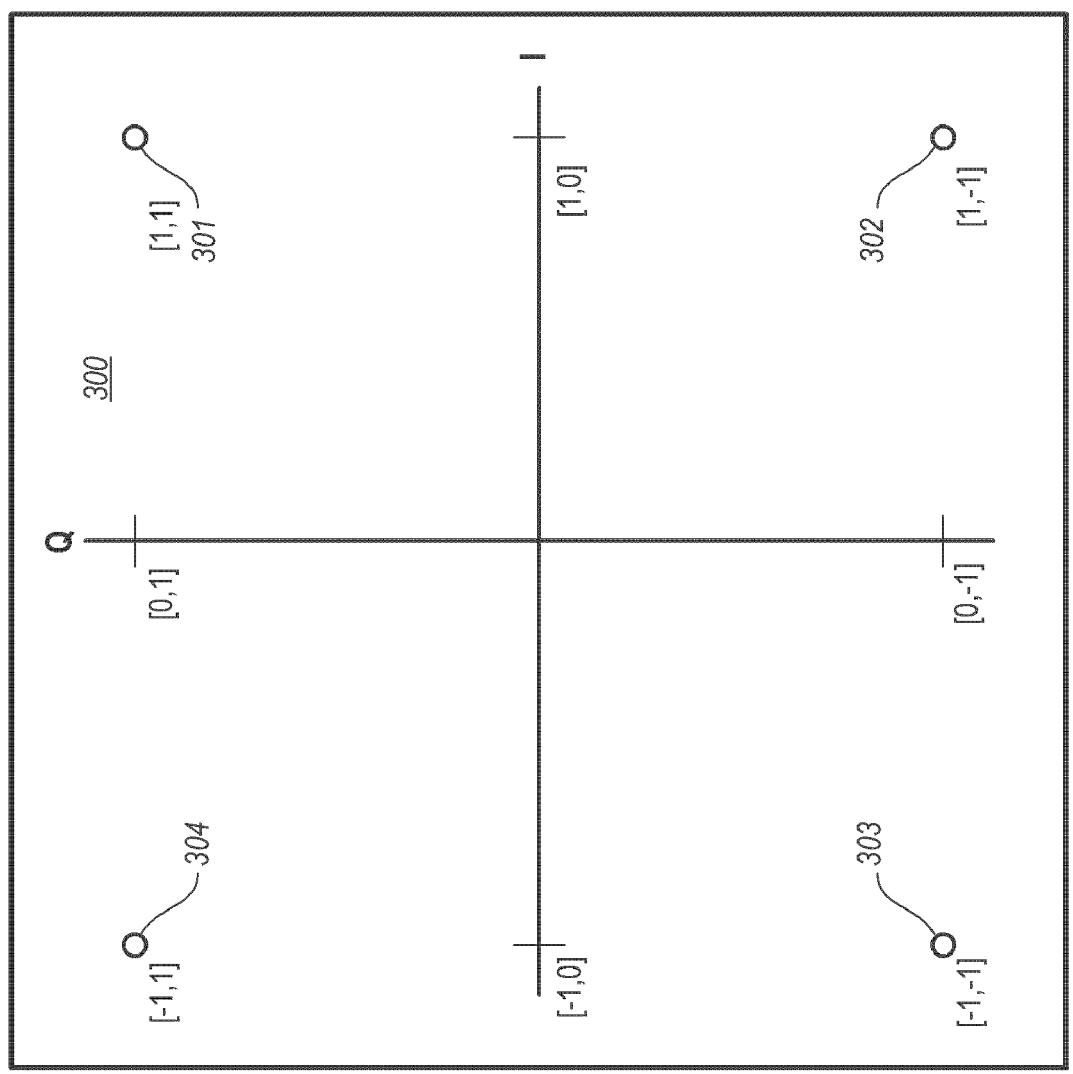
FIG. 3 illustrates a resulting four symbol IQ constellation graph.
Figure 4:
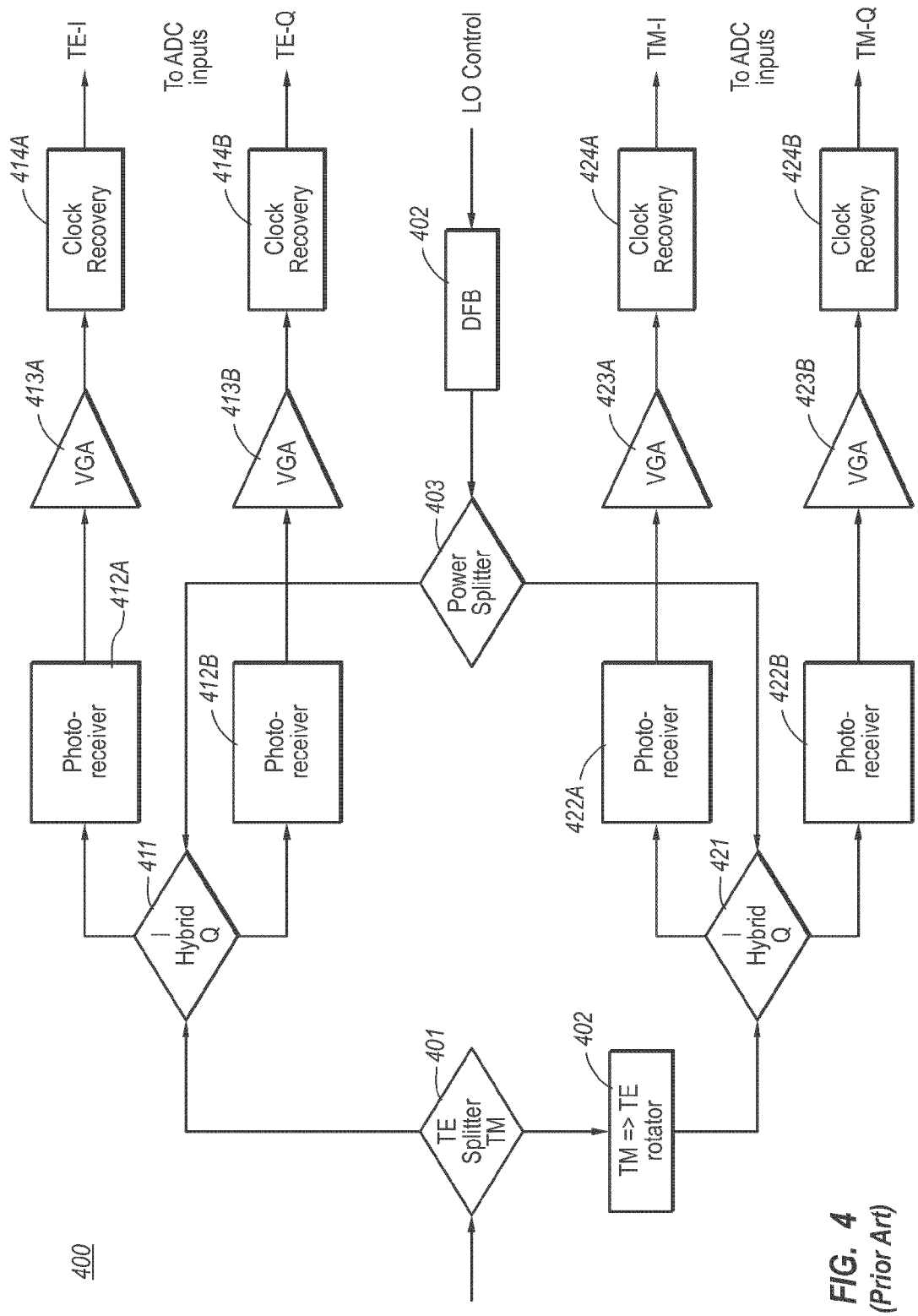
FIG. 4 illustrates an example architecture for the four-channel demodulator of FIG. 1.
Figure 9:
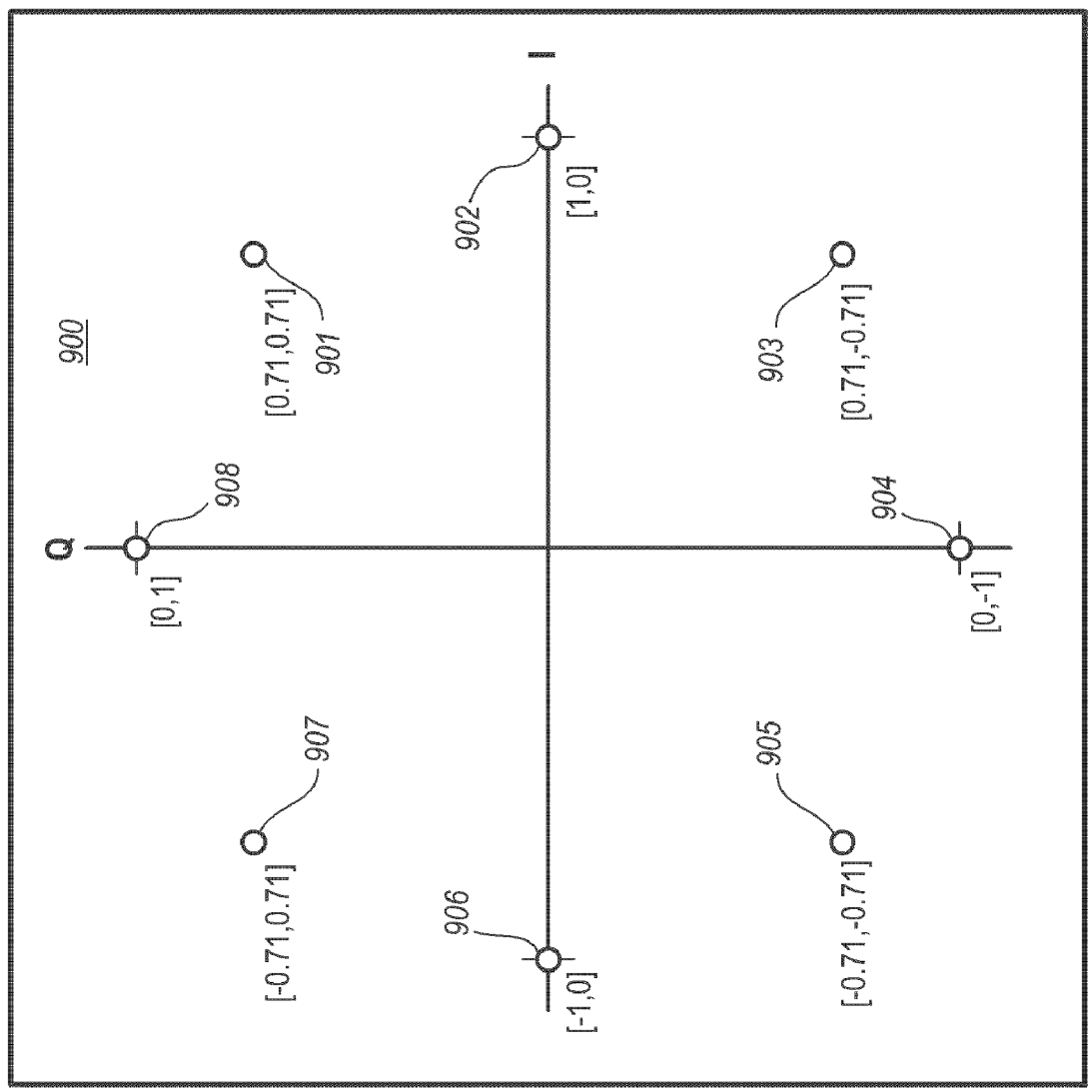
FIG. 9 illustrates the eight symbol constellation as plotted on an IQ constellation graph that results from the transmitter of FIG. 8.

FIG. 9 illustrates the resulting 8 symbol constellation as plotted on an IQ graph 900. There are still eight symbol points 901 through 908. However, the amplitude of the symbols 901 through 908 is now constant. In addition, the symbol points are separated by 45 deg. The amplitude of the waveform is 1 and the spacing between adjacent symbols is approximately 0.75. To compare to the 4PSK constellation of FIG. 3, suppose the waveform amplitude is considered at 1.4 (which is a factor of the square root of two greater than that shown in FIG. 9). For 8PSK with the waveform amplitude of 1.4, the adjacent symbol spacing is 1.1, which compares to adjacent symbol spacing of 2 for 4PSK with the same waveform amplitude of 1.4. By further comparison, 16PSK with the same waveform amplitude of 1.4 has adjacent symbol spacing of about 0.55.

The 8 PSK transmitter 800 is quite complicated. Also, the timing of the various PM and AM modulators should be properly aligned to avoid spikes or nulls between symbol transitions.

Figure 10:
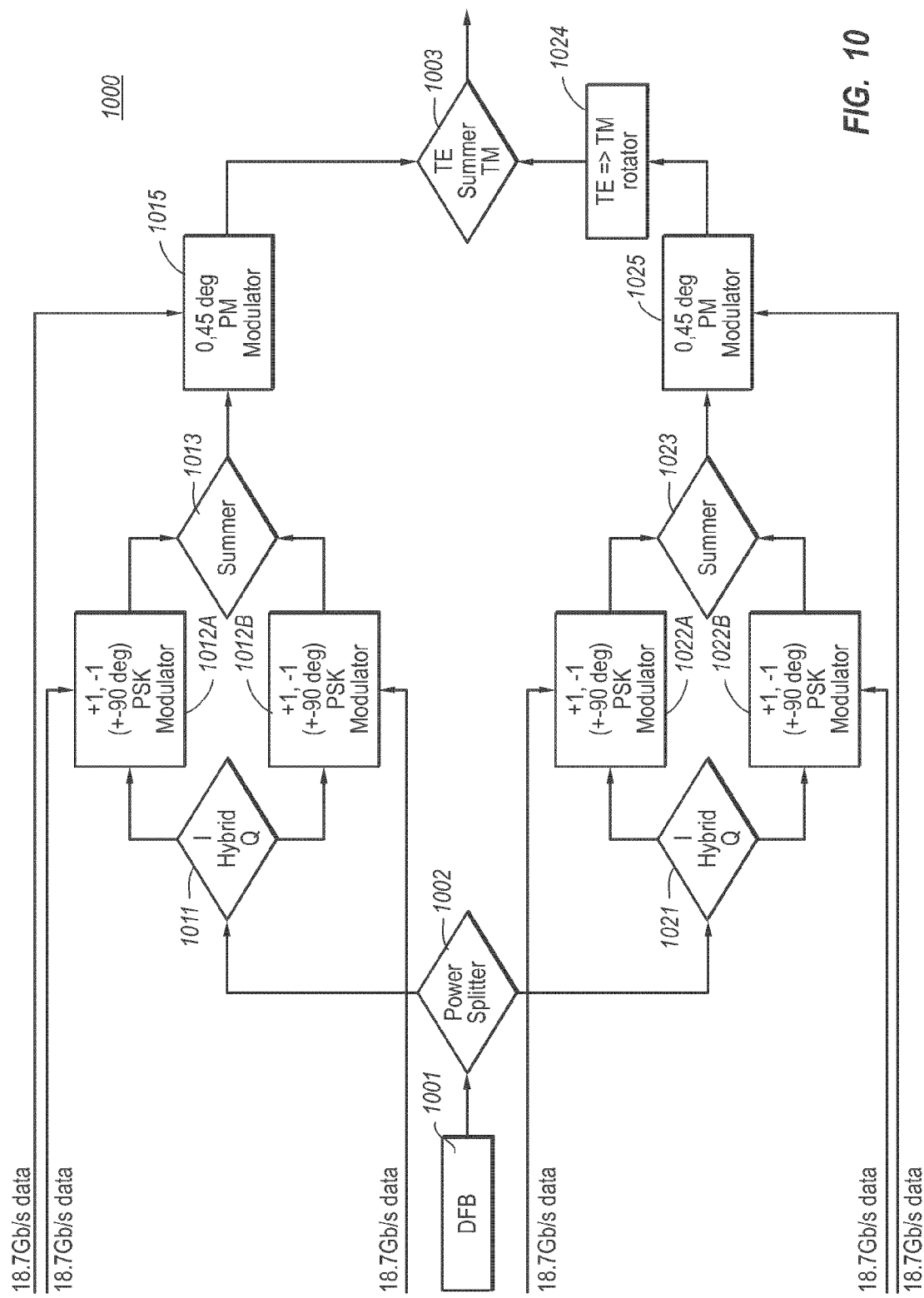
FIG. 10 illustrates another example transmitter architecture that uses only phase modulation data.

FIG. 10 illustrates another example 8PSK transmitter 1000. In this case, there is no AM data, but instead 6 streams of PM data. The components 1001, 1002, 1003, 1011, 1012A, 1012B, 1013, 1021, 1022A, 1022B, 1023 and 1024 may be similar to the respective components 201, 202, 203, 211, 212A, 212B, 213, 221, 222A, 222B, 223 and 224 of FIG. 2, except that the symbol rate is 18.7 Gigasymbols per second per polarization in FIG. 10, versus 28 Gigasymbols per second per polarization in FIG. 2. In addition, an additional PM modulator 1015 is provided for the TE polarization branch, and an additional PM modulator 1025 is provided for the TM polarization branch. Depending on the additional third bit of PM data, the modulators 1015 and 1025 will either allow the input signal to pass to the output signal, or rotate the signal 45 degrees on the IQ graph. This would achieve the 8 symbol constellation plot of FIG. 9. This implementation is also complex and requires very precise timing alignment of all the elements to result in adequate performance.

Figure 11:
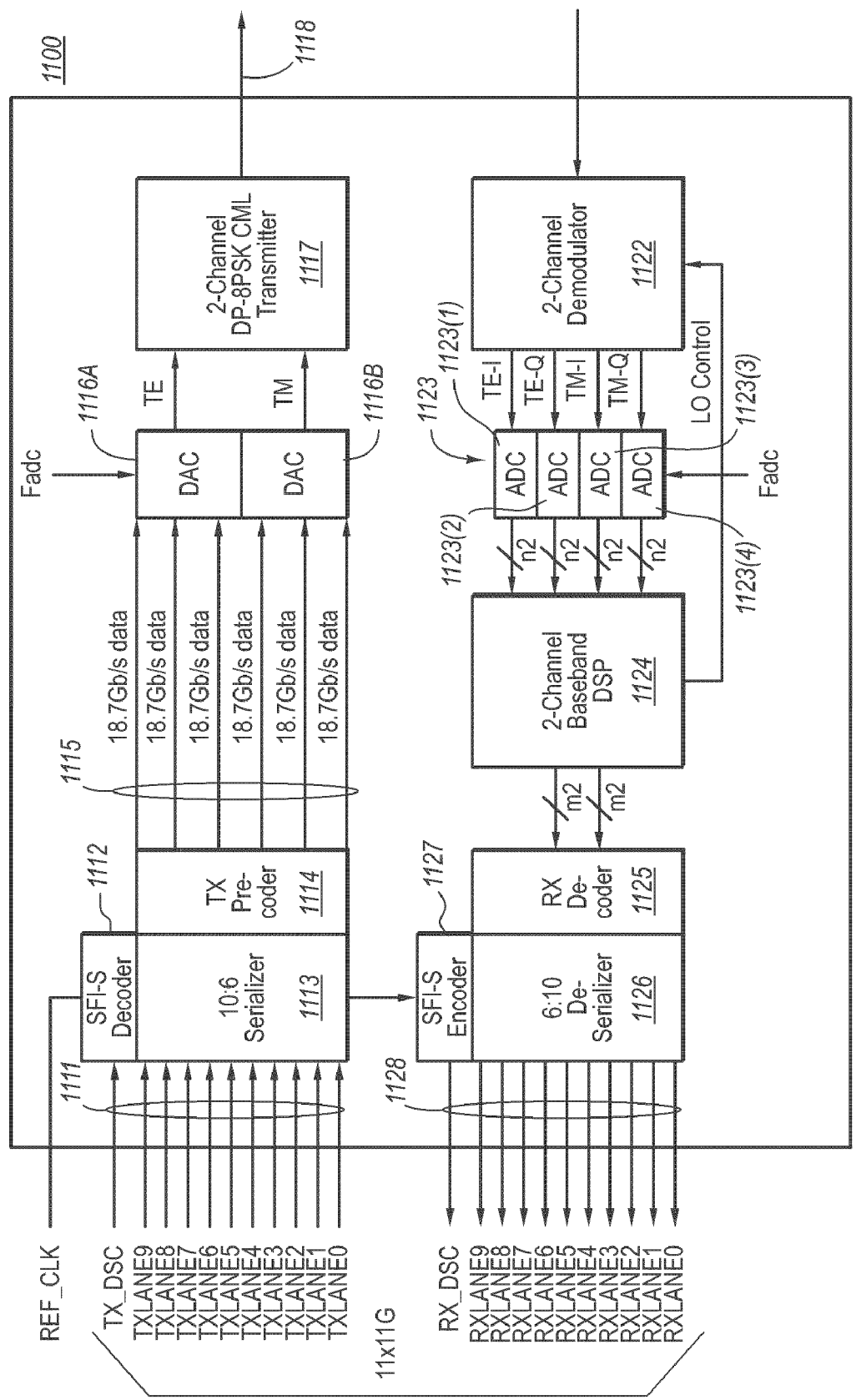
FIG. 11 illustrates a DP-8PSK transponder that uses a Chirp-Managed Laser (CML) laser to perform PSK modulation.

FIG. 11 illustrates a more preferred implementation of a transponder 1100. In this specific case, the transponder operates to transmit and receive at 112 Gigabits per second. As will be apparent from this description, FIG. 11 is just a very specific example, and in no way limits the broader scope of the present invention. In this specific transponder 1100, 11 data lanes 1111 are provided to the system 1100. The SFI-S decoder 1112 and the 10:6 deserializer 1113 may be similar to the corresponding components 512 and 513 described with respect to FIG. 5. The 10:6 deserializer 1113 provides 6 lanes of digital data to the pre-coder 1114 which provides 6 digital lanes (referred to collectively as 1115) of PM data, three for each of the TE polarization and TM polarization.

The TX pre-coder 1114 sends 3 data lanes to the TE 3-bit Digital to Analog Converter (DAC) 1116A, and 3 data lanes to the TM 3-bit DAC 1116B. There are a variety of DAC architectures available. In the case of 4PSK, 8PSK, and 16PSK a two-three and four bit DAC, respectively may used. Such a DAC may, for example, be a resistor-based output thermometer code. For instance, in the case of an 8PSK system, the three bit digital input may be converted into an 8-bit thermometer code, where each bit in the thermometer code is used to control a current switch. The currents from the 8 current switches may then be summed together to form the drive current/voltage.

The corresponding analog signal from the DAC 1116A is provided to the two-channel DP-8PSK Chirp Managed Laser (CML)-based transmitter 1117, where the analog signal is used to provide an 8PSK modulated signal on the TE polarization of the optical signal using a CML. Likewise, the corresponding analog signal from the DAC 1116B is provided to the 2 channel DP-8PSK CML-based transmitter 1117, where the analog signal is used to provide an 8PSK modulated signal on the TM polarization of the optical signal using a CML. The resulting TE and TM polarized optical signals are optically summed, and provided on the transmit optical fiber 1118.

Figure 12:
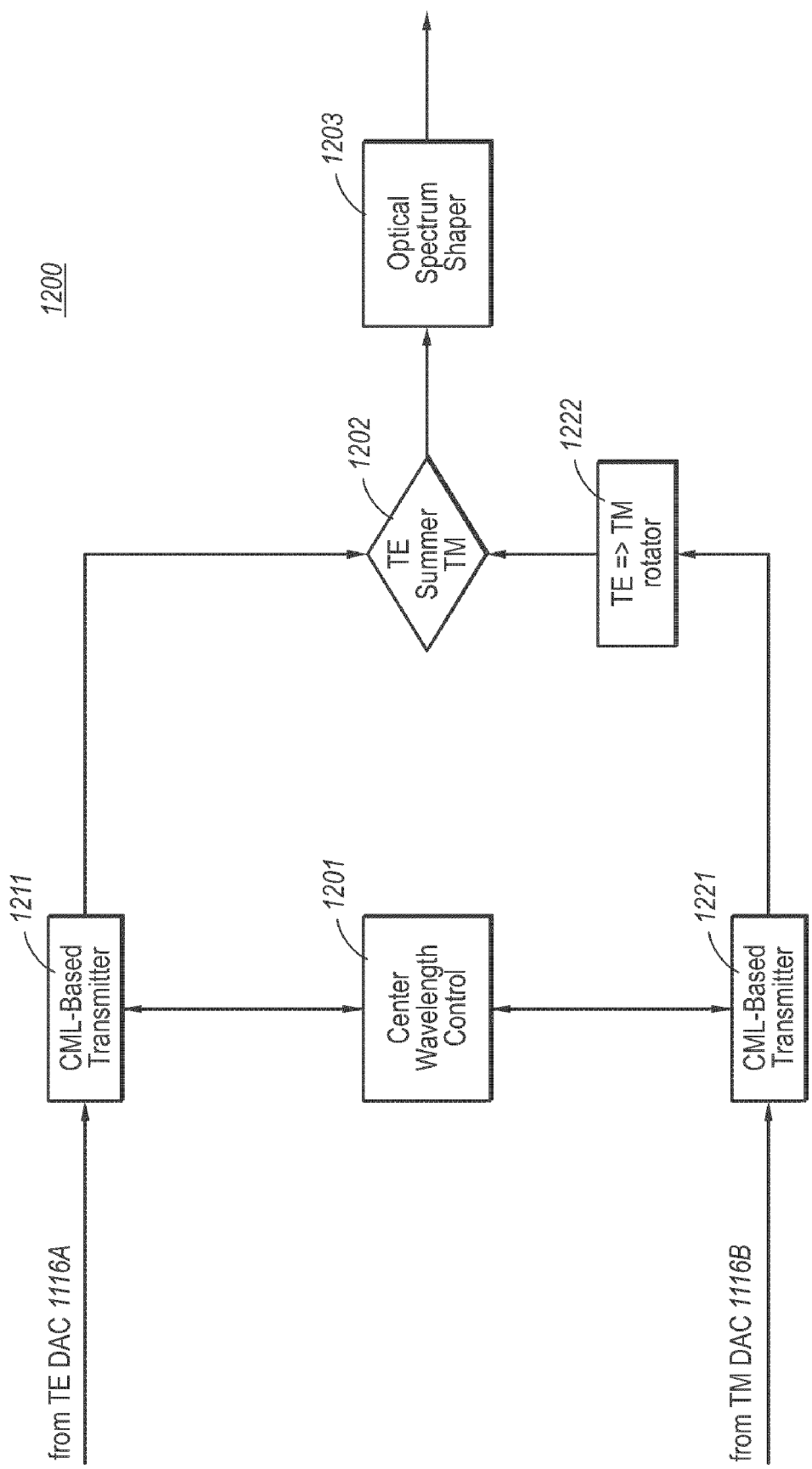
FIG. 12 illustrates an architecture for the two-channel DP-8PSK CML based transmitter of FIG. 11.

FIG. 12 illustrates an architecture 1200 for the two-channel DP-8PSK CML based transmitter. Essential, each channel includes an 8PSK modulated signal being generated by a corresponding DFB where the appropriate symbol being encoded is specified by the analog signal provided from the corresponding DAC. The 8PSK modulated signal is then subjected to an optical spectrum shaper. Specifically, the TE branch includes a first CML-based transmitter 1211 that receives the analog signal from DAC 1116A. The TM branch includes a second CML-based transmitter 1221 that receives the analog signal from DAC 1116B. Each CML-based transmitter 1211 and 1221 incorporates a CML. Further, each of the CML-based transmitters 1211 and 1221 are controlled by a center wavelength control 1201 to keep the frequency of the two CML-based transmitters roughly together. In one embodiment, the frequencies of the CML-based transmitters are kept within 1 GHz or less of each other. This would allow a single Local Oscillator (LO) source to be used to demodulate the received TE and TM signals. The TE optical signal from the TE CML-based transmitter laser 1211 is summed with the TE optical signal from the TM CML-based transmitter 1221 (after being rotated to TM polarization by rotator 1222) using optical summer 1202. The summed optical signal is then subjected to optical spectrum shaper 1203.

Figure 13:
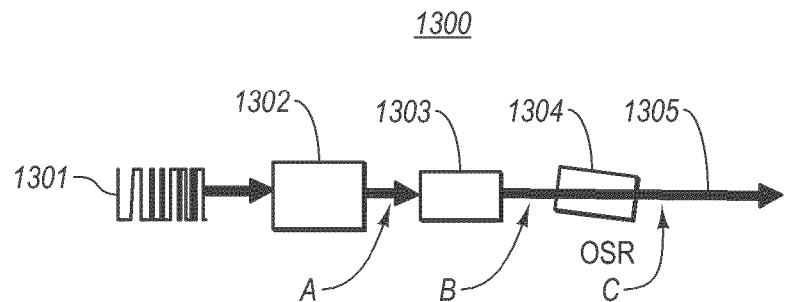
FIG. 13 illustrates an example CML-based transmitter for generating a DNPSK signal.

FIG. 13 illustrates an example of the CML-based transmitters 1211 and 1221 of FIG. 12 in the form of transmitter 1300. The transmitter 1300 may be used to perform 8PSK modulation, but may also be used to perform nPSK modulation where n is any plural positive integer, and permits any complex modulation that includes an in-phase branch and a quadrature phase branch. In order to describe the transmitter, the function of the transmitter in order to perform DPSK (i.e., 2PSK) will first be described. Then, the use of the transmitter to perform QPSK (i.e., 4PSK) will then be described. All along the way, the principles will be extended to an 8PSK modulation technique.

The transmitter 1300 includes an Frequency Modulation (FM) source 1303 (such as a Chirp-Managed directly modulated Laser (CML) laser), and an optical spectrum reshaper (OSR) 1304, used to generate an nPSK signal, such as an RZ-nPSK signal, without the use of external modulators. The OSR 1304 may include a multi-cavity etalon filter, a single or multi-cavity ring resonator filter, an arrayed waveguide grating (AWG) filter, and fiber Bragg grating filter.

A binary electrical digital data stream 1301 is fed into a digital multi-level transformer (DMT) 1302, which converts the two level input to, for example an n+1 level output according to the procedure described below. For instance, for DPSK, the DMT 1302 might receive but a single two level input to generate a three level output. For QPSK, the DMT 1302 might receive two two level inputs to generate a five level output. For 8PSK, the DMT 1302 might receive three two level inputs to generate a nine level output. In the case of FIG. 11, for example, the DMT 1302 might be the DAC 1116A or 1116B in the case of 8PSK. Alternatively, the DMT 1302 may be programmed to process multi-bit sequences, such that the multilevel DMT 1302 outputs more than two levels each corresponding to a unique bit sequence.

The n+1 level digital signal from the DMT 1302 is used to drive the FM source 1303 which converts the input digital 3 level signal to a multi-level optical signal with both frequency and intensity modulation. The output of the FM source 1303 is then transmitted through the OSR 1304 and into an optical fiber 1305 (or in the case of FIG. 12, to the optical summer 1202).

The amplitude of the electrical signal is chosen to generate a particular frequency excursion and amplitude excursion by the laser 1303 corresponding to the amplitude of the input digital signal. The optical output of the CML laser 1303 is passed through the OSR 1304, which may have two functions: 1) to increase the amplitude modulation of the input signal, and 2) to convert the input adiabatic frequency excursion to a flat topped chirp with nearly instantaneous abrupt phase shifts near the null outputs of the signal, as described in U.S. patent application Ser. No. 11/084,630, filed Mar. 18, 2005, which is incorporated herein by reference.

Figure 14:
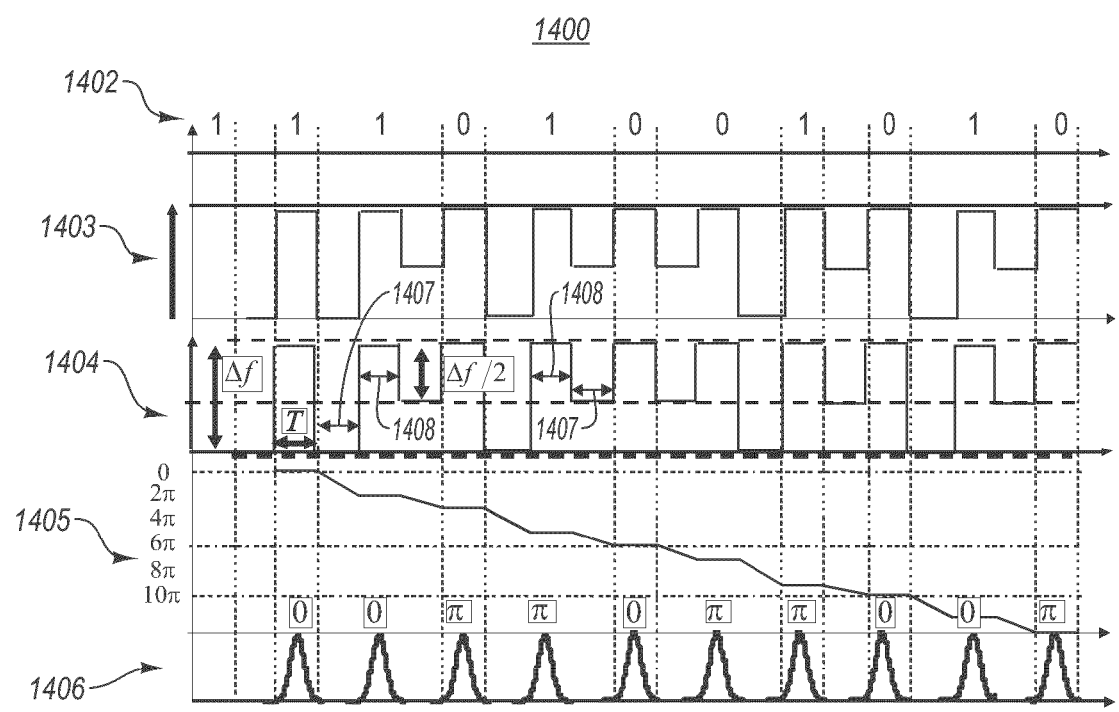
FIG. 14 is a timing diagram illustrating signal levels at points within a CML-based transmitter used to generate a DPSK signal.

To further elucidate this description, consider a DPSK (i.e., 2PSK) example 1400 of FIG. 14 in which the input binary digital bit sequence $a_n$= . . . 1 1 1 0 1 0 0 1 0 1 0 0 0 1 1 0 1 0 1 1 0 1 1. FIG. 14 shows the bit sequence 1402, and pulse shapes at various points in the transmitter chain labeled A, B, and C. The data sequence is input to the DMT 1302, which generates, at point A, the signal 1403 of FIG. 14 having the pulse shapes shown. The output of the DMT 1302 drives the FM source 1303, which generates an optical signal having the illustrated frequency profile 1404 and phase progression 1405 at point B. The frequency profile 1404 includes pulses each including both a phase modulated portion 1407 and a fixed phase portion 1408. For purpose of this disclosure "fixed phase" signifies that that fixed phase portion 1408 has a substantially constant frequency about equal to a carrier frequency across its duration and therefore does not experience a phase shift to the same degree as the phase modulated portion 1407, enabling the phase shift across the phase modulated portions to substantially define the phase difference between contiguous fixed phase portions However, in some embodiments, the fixed phase portion 1408 has a non-ideal pulse shape such that some phase variation occurs. In some embodiments, in the case of DPSK, the phase difference across the fixed phase portion is less than $\pi/8$, preferably less than $\pi/16$, and more preferably less than $\pi/32$. For QPSK and 8PSK, even a higher degree of phase accuracy in the fixed phase portion may be advantageous. The phase modulated portion 1407 has a frequency chosen to modulate the phase of the immediately following fixed phase portion 1408 in order to encode information in the phase of the fixed phase portion 1408. The fixed phase portion 1408 may have a 50% duty cycle, however other duty cycles such as from 30% to 50% or from 50% to 60% may be used.

The phase modulated portions 1407 and fixed phase pulse portions 1408 are produced by the FM source 1303 in response to the signal A which is generated by the DMT 1302 according to the following rules. In the case of DPSK, when a bit is equal to the previous bit, $b_n=b_{n-1}$, the signal 1403 at point A drops to 0 (changes by V), stays at the 0 value for a time T, preferably equal to 50% of the bit duration to generate the phase modulated portion 1407. The signal 1403 then returns to the value V for the remainder of the duration of the bit to generate the fixed phase portion 1408 for that bit. Thus, when the bit is equal to the preceding bit, $b_n = b_{n-1}$, the frequency profile 1404 of the laser output at point B drops from a peak frequency $f_0$ to a low frequency $f_2$ for a time T, and returns to the peak frequency $f_0$ for the remainder of the bit duration.

When a bit is different from the previous bit, $b_n \neq b_{n-1}$, the phase signal 1403 drops to V/2 and stays at that value for a time period equal to T to generate the phase modulated portion 1407. The signal 1403 then returns to the value V for the remainder of the bit duration to generate the fixed-phase portion 1408 for that bit. Thus, when the bit is different from the last value, $b_n \neq b_{n-1}$, the frequency profile 1404 of the laser output at point B drops from a peak frequency $f_0$ to an intermediate frequency $f_1$ for a time period equal to T, and returns to the peak frequency $f_0$ for the remainder of the bit duration.

This choice of voltage output guarantees the generation of the proper phase relation between bits at the output of a frequency modulated source, as described below. The FM source 1303, such as a DFB laser, is driven by the voltage pattern at point A, and generates a frequency and amplitude modulated output waveform at point B having the illustrated frequency profile 1404 and phase progression 1405. The value of the drive voltage, V, may be chosen to generate a frequency excursion which is equal to the bit rate of the digital signal, e.g. 10 GHz for a 10 Gb/s data stream with 50% duty cycle. More generally, the full frequency excursion, $\Delta f$ is chosen such that $\Delta f \times T = 1$, where T is the duration of the 0 value and is equal to ½ the bit period for a 50% duty cycle pulse.

The voltage is determined by the so called FM efficiency of the source, $\eta_{FM}$, in GHz/V; in other words: $\Delta f = \eta_{FM} V$. The phase of the optical signal at the output of the DFB is the time integral of the frequency excursion as shown in FIG. 14. For example for a 10 Gb/s return-to-zero (RZ) data with 50% duty cycle, the phase of the frequency modulated signal slips by 10 GHz×2π×50 ps=2π, when the full frequency excursion $\Delta f = 10$ GHz is applied.

When the adjacent bits are different, the DMT 20 produces ½ the voltage; generating 5 GHz frequency excursion for the case of 10 Gb/s RZ. In this case the phase of the signal slips by 10 GHz×2π×50 ps=π, and the resulting adjacent pulses will have a π phase shift between them. The output of the FM source is passed through the OSR 1304 which increases the amplitude excursion and flattens the chirp, as shown by the output pulses 1406 at point C in the transmitter train. The OSR 1304 may have the functionality described in the patent applications incorporated herein by reference. As shown in FIG. 14, the intensity at point C is an RZ-DPSK signal wherein each bit carries equal energy and the data is encoded in the phase of the bits.

The amplitude of the resulting pulses at the output of the FM source 1303 is not shown, but typically follows the frequency excursion. If the source has independent control for amplitude and frequency excursion, then the amplitude can be adjusted separately to generate an RZ pulse shape. In this case the amplitude modulation may require a separate electrical signal, which is programmed to provide the desired amplitude modulation after the OSR 1303. For example, the amplitude modulation is reduced for bits having large frequency excursion and increased for bits having small frequency modulation such that the output amplitude of high level and low levels after OSR 1303 are about the same. The output amplitude after the OSR preferably approximately satisfies the following equation:

$$AM(t) + FM(t) \times (OSR\ \text{slope}) = \text{constant} \quad (2)$$

wherein AM is amplitude modulation depth in dB, which is defined as the ratio of the 1 level to the 0 level, FM is the frequency modulation in GHz, slope is slope of the OSR 1303 in dB/GHz. In the example above, if the FM source 1303 has independent control of output amplitude, the AM component would be programmed to output voltage $V_{AM}$ when the frequency is at half the maximum, i.e. $\Delta f/2$ and the amplitude is set to $V_{AM}/2$ when the frequency excursion is at maximum, i.e. $\Delta f$ Here $V_{AM}$ is chosen to provide the appropriate amplitude response, and depends on the AM slope efficiency of the source.

Figure 15:
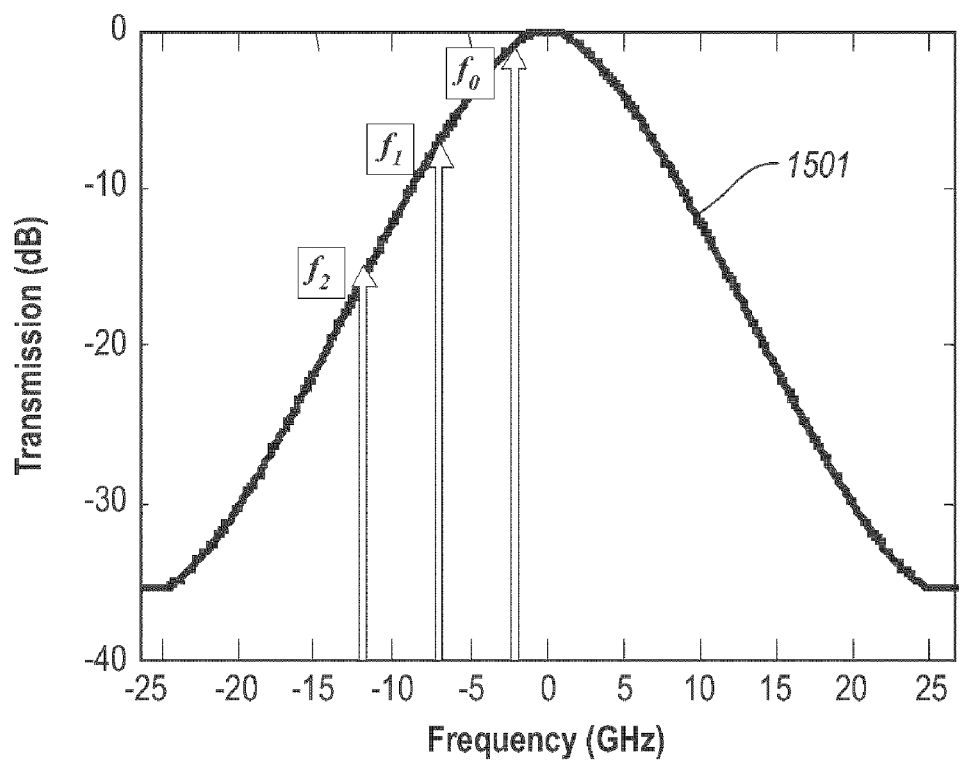
FIG. 15 is a plot of an optical spectrum reshaper transmission function and frequency levels used for CML-based phase modulation.

FIG. 15 shows an example of an OSR transmission function 1500 and the spectral positions of the various frequency values $f_0$-$f_2$ at the output of the FM source. Here the peak frequency, $f_0$, which corresponds to the highest amplitude is aligned with a relatively low loss point on the OSR 1304, while the middle frequency $f_1$ is aligned to have higher loss (~10 dB). The frequency $f_2$ suffers higher loss because it is a lower frequency as shown in FIG. 15. Ideally the signal levels at the output C of the OSR 1304 will be such that the 0 energy in the $f_1$ level and $f_2$ levels will be negligible (e.g. <−10 dB) below the energy in the peak of the 1s. In the illustrated embodiment, the OSR 1304 may be used at its transmission edge and is also bandwidth limiting. A variety of OSR shapes can introduce discrimination between the various frequency components to generate the desired amplitude response after the OSR 1304.

Importantly it should be noted that a key function of the OSR edge is the transformation of the adiabatic chirp at the output of the FM source 1303 to flat-top chirp with abrupt phase shifts at the 0s, as has been described in U.S. Provisional Patent Application Ser. No. 60/548,230, filed Feb. 27, 2004 by Yasuhiro Matsui et al. for OPTICAL SYSTEM COMPRISING AN FM SOURCE AND A SPECTRAL RESHAPING ELEMENT; U.S. Provisional Patent Application Ser. No. 60/554,243, filed Mar. 18, 2004 by Daniel Mahgerefteh et al. for FLAT CHIRP INDUCED BY FILTER EDGE; U.S. patent application Ser. No. 11/084,630, filed Mar. 18, 2005 by Daniel Mahgerefteh et al. for FLAT-TOPPED CHIRP INDUCED BY OPTICAL FILTER EDGE; and U.S. patent application Ser. No. 11/084,633, filed Mar. 18, 2005 by Daniel Mahgerefteh et al. for METHOD AND APPARATUS FOR TRANSMITTING A SIGNAL USING SIMULTANEOUS FM AND AM MODULATION. The resulting uniform phase generated by the transfer function of the OSR 14 may advantageously be used to generate a RZ-DPSK signal with improved sensitivity.

Figure 16:
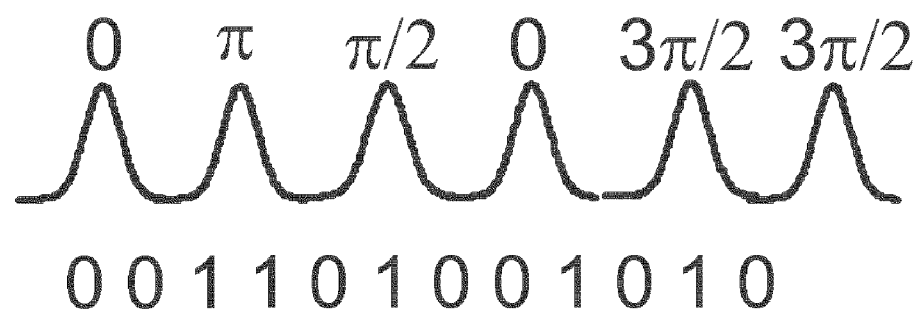
FIG. 16 is a plot of an output of one embodiment of a DQPSK output.

Referring to FIG. 16, in alternative embodiments, the above described transmitter 10 may be used to generate a quadrature phase shift keyed signal (RZ-QPSK), for which the information is coded into four possible phases, such as {0, π/2, π, −π/2}. Each pulse may therefore be used to code two bits of information, i.e. 00, 01, 10, and 11, thereby doubling the rate of data transfer. In this case the multilevel digital transformer produces a four signal levels, $V_k$, such that the frequency $f_k$ of the phase modulated portions 1407, satisfies the relation:

$$2\pi \Delta f_k \times T = \{2\pi, \pi/2, \pi, 3\pi/2\} \quad (3)$$

The OSR transmission function is preferably chosen such that after exiting the OSR 1304, the phase modulated portion 1407 of each bit is about <−1 dB below the amplitude of the fixed phase portions 1408. In the case that the source has independent FM and AM modulation the amplitude may be adjusted to provide constant amplitude for the output pulses.

As is clear from the above two examples a variety of multilevel phase coded signals can be generated by using the scheme described above by adjusting the frequency excursion to generate the desired phase in the desired bit. The phase modulated portion 1407 may have N frequency levels resulting in N possible phases for each fixed phase portion 1408 in order to encode unique bit sequences of length $\log_2$ N. For example, an eight state PSK scheme may be used wherein each bit encodes three bits of data. In such a scheme, each fixed phase portion 1408 may have a phase of $\{0, \pi/4, \pi/2, 3\pi/4, \pi, 5\pi/4, 3\pi/2\}$ each corresponding to a unique three bit sequence $\{000, 001, 010, 011, 100, 101, 110, 111\}$. Such may be the case of the CML-based transmitters 1211 and 1221 of FIG. 12.

The pulses in the embodiment of FIG. 15 are return-to-zero (RZ). This means that the energy in the pulse occupies a fraction of the bit period (e.g. 50%), while the rest of the bit period carries no energy at all; i.e. the zero. Note that in the nomenclature of RZ-DPSK the zeros do not represent logical information. In other words, the 0 does not mean compliment of a 1. In RZ-DQPSK the output power reduced to the low ("zero") level between every two bits regardless of their value. Going forward we will call the "zero" level instead a low level, in order to avoid confusion with the logical 1s and 0s of the digital information.

In DQPSK, the desired changes in phase between bits, are 0, $\pi/2$, $\pi$, and $3\pi/2$. Because of the periodicity of phase, the phase shift can be shifted by an integer multiple of $2\pi$ without any change in final result. In other words, the set of phase values representing the four possible states of the incoming two bit word digital signals can be $2n\pi+(0, \pi/2, \pi, $ and $3\pi/2)$, n=0, 1, 2, 3, 4, where n is an integer.

As shown in Equation 3, the laser is driven to generate an chirp value such that the phase shift during the low level generates the desired change in optical phase satisfying; i.e. $2\pi\Delta f_k \times T = \{2\pi, \pi/2, \pi, 3\pi/2\}$. The chirp difference between the bits allows the use of the OSR 14 to generate a low level that is >10 dB below the high level for all the bits. In order to generate the low levels between two bits that are in phase; i.e. bit value 0, the above configuration of the FM source 1303 requires that the phase shift be made to swing through $2\pi$, or some multiple of it, in order to generate a frequency shift between the two adjacent levels, which have the same phase and same amplitude. This increases the chirp requirements for the laser to be a maximum of 2× bit rate frequency; i.e. 20 GHz for a 10 Gb/s signal or 50 GHz for a 25 Gb/s signal with 50% duty cycle. In some cases this requirement makes laser design prohibitive.

Figure 17:
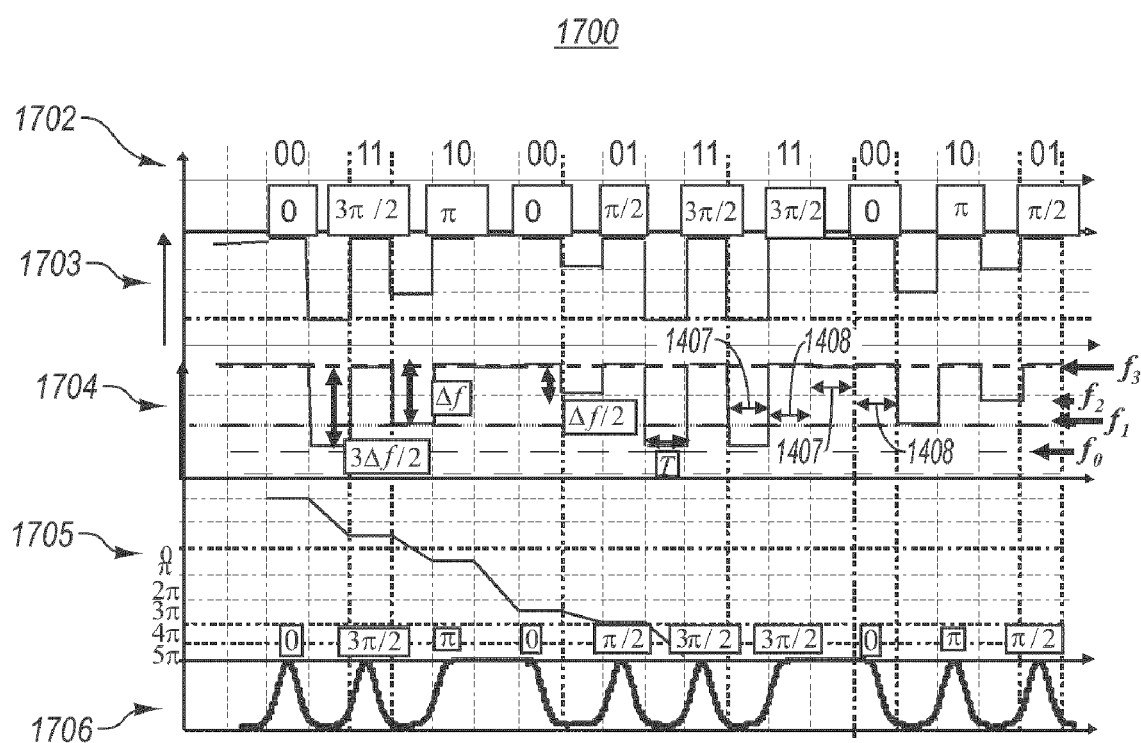
FIG. 17 is a timing diagram illustrating signal levels at points within a transmitter generated using an alternative method for generating a DQPSK signal in accordance with an embodiment of the present invention.

Accordingly, in the embodiment of FIG. 17, the requirements on the FM efficiency of the laser for generation of DPSK or DQPSK are relaxed by using a variation of the above described method in which no pulse is generated when the incoming bit is a 00; i.e. when the bit is 00, the driver output remains constant, such that the output of the FM source 12 during the entire duration of the 00 bit sequence will be equal to the frequency of the fixed phase portions 1408. In some embodiments, a bit combination other than 00 is selected to generate no pulse.

FIG. 17 illustrates the values of a data signal 1702, the output 1703 of the DMT 1303, the frequency profile 1704 and phase progression 1705 of the FM source 1303, and the output 1706 of the OSR 1304 for such a differential quadrature phase shift keying (DQPSK) scheme. As is apparent in the output 1706 of the OSR 1304, for the 00 bit sequence, the output remains constant rather than dropping to the low inter-pulse level such that the phase modulated portion 1407 and fixed phase portion 1407 have about the same frequency.

Since the coding is differential, a 0 input phase requires that the output of the multi-level digital encoder remains unchanged. This scheme also reduces the number of output levels by one; i.e. the voltage only needs to swing to values V/2, V, and 3V/2. The corresponding frequency shifts are $f_2$, $f_1$, and $f_0$, respectively. The voltage is adjusted to generate the required chirp and depends on the FM efficiency of the laser. For a typical DFB laser the FM efficiency is typically 8-10 GHz/2V into a 50 ohm matching load resistance; i.e. 0.20-0.25 GHz/mA. Assuming the duration of the modulated phase portion of the signal to be T, the corresponding frequency shifts are given by $\Delta f$–0, ¼T, ½T, and ¾T to generate phase shifts of 0, $\pi/2$, $\pi$, and $3\pi/2$ respectively. For a 50% duty cycle RZ transmitter the duration of the phase modulated portion is half of the bit period, so that T=½B, where B is the bit rate, so that the required frequency shifts become $\Delta f$=0, B/2, B, and 3B/2.

In the embodiment of FIG. 17, the OSR filter 1304 may advantageously be designed such as to attenuate the frequencies $f_2$, $f_1$, $f_0$ by more than 10 dB relative to the frequency $f_3$ of the fixed phase portions. The extinction ratio of the output levels will be determined by the sum of the AM extinction ratio and the extinction resulting from FM/AM conversion, which arises by adjusting the laser wavelength to be aligned with the transmission edge of the OSR filter.

As an example consider the case of B=10 Gb/s DQPSK and a DFB laser with a FM efficiency of 10 GHz/2V. Once a multi-level driver signal is generated, such a laser can be used together with an OSR filter 14 to generate DQPSK. This is because the required chirp values for 0, $\pi/2$, $\pi$, and $3\pi/2$ are 0, 2.5 GHz, 5 GHz, and 7.5 GHz, all of which can be supplied by a multi-level driver with 2 Vpp voltage.

Figure 18:
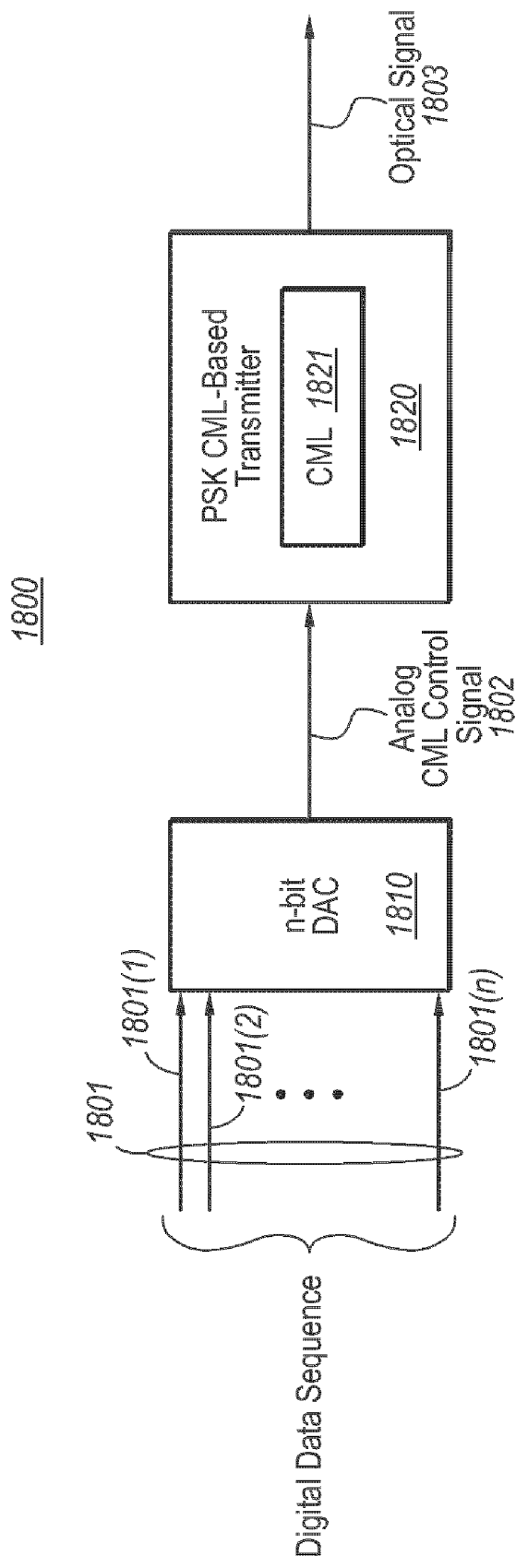
FIG. 18 illustrates a general embodiment of a transmitter that uses high-order PSK modulated CML-based optical transmission.

FIG. 11 illustrates a very specific embodiment of a transponder 1100 that uses PSK modulated CML-based optical transmission. FIG. 18 illustrates a more general embodiment of a transmitter 1800 that uses PSK modulated CML-based optical transmission. If dual-polarization is employed, then the transmitter 1800 may be replicated for each polarization (e.g., one for TE polarization and one for TM polarization).

"n" lanes of digital data channels 1801 are received into an n-bit Digital-to-Analog Converter (DAC) 1810. The expressly illustrated digital data channels include bit sequence 1801(1), 1802(2), and 1802(n). The ellipses represents that there may be more bit sequences received into the DAC 1810 for even higher-order PSK modulation. The n-lane digital data channel 1801 provides a synchronized sequence of n-bit digital data signals.

In one embodiment, each of the n bit sequences represents a sequence of binary bits. In that embodiment, there would be three bit sequences (n=3) to support 8PSK modulation. This would cause the analog CML control signal 1802 output from the DAC 1310 to have approximately 8 different levels (one for each of the eight possible symbols). In the purely binary embodiment, there would be four bit sequences (n=4) to support 16PSK modulation causing the analog CML control signal 1302 to have approximately 16 different levels (one for each of the 16 possible symbols), and so forth for higher order PSK modulation. For DPSK modulation, there would be but a single input bit sequence 1801(1). For QPSK modulation, there would be two input bit sequences 1801(1) and 1801(2).

It is preferred that the bit sequences be binary bit sequences so as to enable a simpler design for the n-bit DAC 1810. However, the principles of the present invention are not limited to binary bit sequences. They may be ternary, base four, or higher order digital bit sequences. For example, there might be two ternary bit sequences for a total of nine possible values for each symbol. One of the nine possible values may be unused to allow the DAC, through some specialized design, to generate one of eight corresponding analog signal levels for analog signal 1302. Nevertheless, it is preferred that the digital bit sequence include three binary bits sequences to support 8PSK modulation, four binary bit sequences to support 16PSK modulation, and so forth.

In addition, the use of different PSK modulation with some power of two number of possible symbols is convenient (e.g., 8PSK, 16PSK, 32PSK, and so forth). Nevertheless, with some additional complexity especially in the symbol constellations, and in the digital signal processing, there may be other numbers of symbols (e.g., 5 symbols to support 5PSK, 6 symbols to support 6PSK, and so forth including 13 symbols to support 13PSK). Such PSK constellations are not conventionally used, but the principles described herein do not preclude them. The use of a PSK modulation that is 5PSK would still provide improvements in reduced sampling speed over the use of QPSK (or 4PSK). It is preferred that 8PSK or so higher power of two order of PSK (such as 16PSK, 32PSK and so forth) be used so as to reduce complexity and increase processing speed of the digital signal processing.

The at least 8PSK Chirp Managed Laser (CML)-based transmitter 1820 receives the analog signal sequence 1802 and modulates using 8PSK or greater a corresponding symbol on the optical signal 1803 using a CML 1821. The use of the CML allows for a transmitter design that has fewer components and is more flexible. If 8 PSK is employed, the transmitter 1820 may be considered to be an 8PSK CML-based transmitter, if 16PSK is employed, the transmitter may be considered to be a 16PSK-based transmitter. The only difference in the transmitter itself would be that it would operate using 16 different analog input levels rather than 8, and thus would need to have a higher precision response to the input analog signal The transmitter 1800 is just for one polarization state (e.g., TE polarization or TM polarization, or perhaps no polarization. For dual polarization, the transmitter 1800 could be replicated for each polarization state. The optical results from each transmitter would then be rotated as appropriate, and summed prior to optical transmission.

Returning to FIG. 11, thus far, only the transmit channel of the transponder 1100 has been described. The receive channel will now be described in further detail. Specifically three embodiments of the receive channel will be described, two very specific embodiments, and one more general embodiment. The four-channel demodulator 1122 of FIG. 11 may be the same as the four-channel demodulator 522 of FIG. 5. Accordingly, the demodulator extracts an in-phase portion of the TE polarized signal (TE-I), a quadrature-phase portion of the TE polarized signal (TE-Q), an in-phase portion of the TM polarized signal (TM-I), and a quadrature-phase portion of the TM polarized signal (TM-Q). Accordingly, each polarization is represented by two signal components.

In the preferred implementation, a single Local Oscillator (LO) is used, which can result in a frequency difference between the TE and TM signals, which is equal to the frequency difference between the two CML-based transmitters 1211 and 1221 in the DP-8PSK CML transmitter 1200 described above. An alternate implementation can use two Local Oscillators (LOs), each one controlled independently from the four-channel baseband DSP 1124 to result in negligible frequency difference between TE and TM signals.

The resulting analog signals TE-I, TE-Q, TM-I and TM-Q are then sampled by the Analog-to-Digital Converters (ADC) 1123 to generate an n2 bit digital signal that is provided to the four-channel baseband DSP 1124. The ADCs 1123 may be similar to the ADCs 523 of FIG. 5, and operate at a low sampling rate due to the lower symbol rate. The DSP 1124 selects the appropriate symbol for each of the TE and TM polarization signals, and outputs the m2 bit signal for each to the decoder 1125. The decoder 1125, the 6:10 deserializer 1126, the SFI-S encoder 1127, and the 11 lanes of digital data 1128 may be similar to the respect decoder 525, 6:10 deserializer 526 SFI-S encoder 527, and digital data 528 of FIG. 5.

Figure 19:
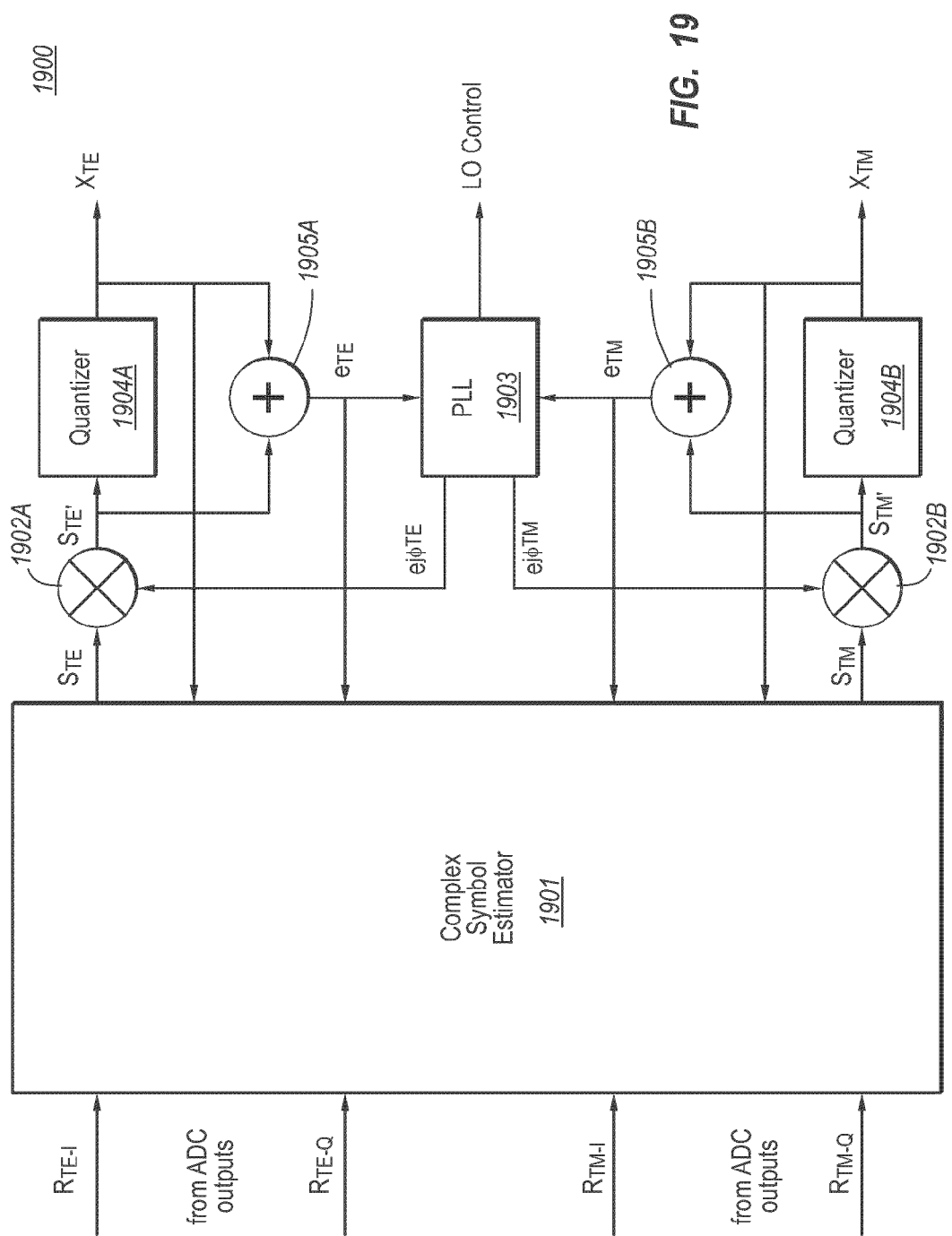
FIG. 19 illustrates an example architecture of the four-channel baseband of FIG. 11.

FIG. 19 illustrates an example architecture 1900 of the two-channel baseband DSP 1124. The inputs to the DSP 1900 are provided by the ADCs 1123. For instance, ADC 1123(1) provides bit sequence $R_{TE-I}$, ADC 1123(2) provides bit sequence RTE-Q, ADC 1123(3) provides bit sequence $R_{TM-I}$, and ADC 1123(4) provides bit sequence ADC $R_{TM-Q}$. The complex symbol estimator 1901 estimates a point $S_{TE}$ on the IQ constellation diagram of the TE polarization using each bit sequence represented by $R_{TE-I}$ and $R_{TE-Q}$. The complex symbol estimator 1901 also estimates a point $S_{TM}$ on the IQ constellation diagram of the TM polarization using each bit sequence represented by $R_{TM-I}$ and $R_{TM-Q}$.

These estimates may be done using any one of several possible estimation algorithms. Examples include MMSE, ML, LMS, or ZF-based algorithms. These complex symbol estimates $S_{TE}$ and $S_{TM}$ are then phase rotated by respective phase rotators 1902A and 1902B. The degree of phase rotation is controlled by Phase Locked Loop (PLL) circuit 1903, which based on a previous error between the estimate point and the corresponding symbol point in the IQ constellation charge adjusts the rotation phase up or down. For instance, PLL 1903 provides phase adjustment signal $e^{j\phi TE}$ to the rotator 1902A, where this phase depends on the TE polarization branch error signal $e_{TE}$. The PLL 1903 also provides phase adjustment signal $e^{j\phi TM}$ to the rotator 1902B, where this phase depends on the TM polarization branch error signal $e_{TM}$.

The phase-corrected symbol estimates $S_{TE}'$ and $S_{TM}'$ are then quantized by respective quantizers 1904A and 1904B to generate the closest symbol in the transmit signal constellation producing final symbol estimates $X_{TE}$ and $X_{TM}$, which are provided to the decoder 1125 of FIG. 11.

For the TE polarization branch, the differences circuit 1905A determines the difference between the phase-corrected estimate $S_{TE}'$ and the corresponding quantized symbol $X_{TE}$ and outputs the result as the TE branch error signal $e_{TE}$. Likewise, for the TM polarization branch, the differences circuit 1905B determines the difference between the phase-corrected estimate $S_{TM}'$ and the corresponding quantized symbol $X_{TM}$ and outputs the result as the TM branch error signal $e_{TM}$.

These error signals $e_{TE}$ and $e_{TM}$ are then used to 1) adapt the complex symbol estimator state 1901, 2) adapt the PLL 1903 discrete-time phase estimates $e^{j\phi TE}$ and $e^{j\phi TM}$, 3) adopt the estimate of the LO Control signal that controls the demodulator DFB 1211 and 1221 frequency. As previously mentioned, the PLL 1903 phase estimates $e^{j\phi TE}$ and $e^{j\phi TM}$ are used to rotate the $S_{TE}$ and $S_{TM}$ IQ points. The PLL can use one of several adaptation algorithms, for example, an alpha-beta tracker, or a Kalman filter.

Figure 20:
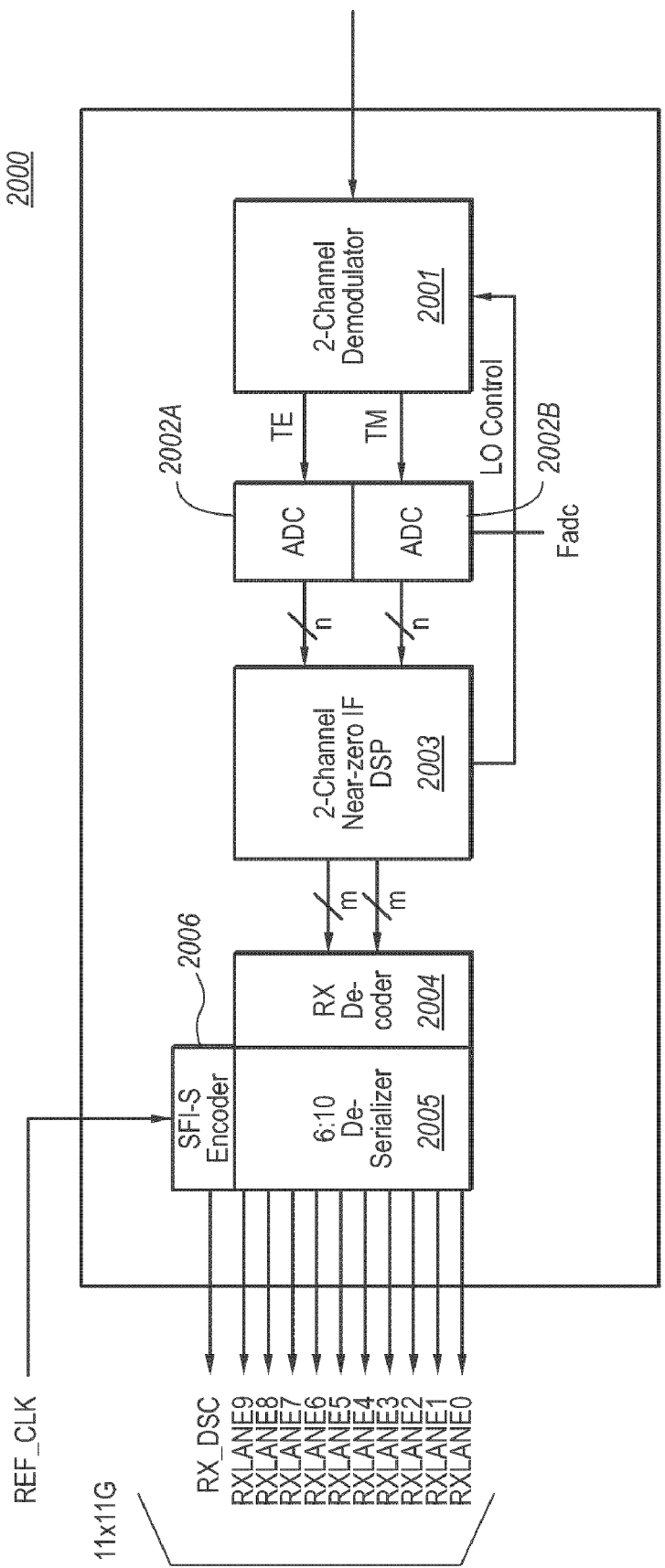
FIG. 20 illustrates an alternative implementation of the receive channel of FIG. 11.

FIG. 20 illustrates an alternative implementation 2000 of the receive channel of FIG. 11. The major difference with the first preferred implementation shown in FIG. 11 is that the input signal is demodulated to near zero IF instead of to baseband. This allows use of only two ADCs, instead of four. However, the ADCs operate at least at twice the Fadc, for example at least 37.4 Gigasamples per second, instead of 18.7 Gigasamples per second for a 112 Gigabit per second optical signal.

The received optical signal is received into a two-channel demodulator 2001, which generates analog signal TE and analog signal TM, which are provided to respective ADCs 2002A and 2002B of the ADC bank. The resulting digital signals are provided to the two-channel Near-zero IF DSP 2003. The DSP 2003 provides a symbol for each of the TE and TM polarization branches in the form of "m" bits to the decoder 2004. The decoded symbols are then deserialized using the 6:10 deserializer 2005. These 10 lanes in conjunction with the data lane provided by the SFI-S encoder 2006 provide 11 lanes of 11 Gigabit per second data lanes.

Figure 21:
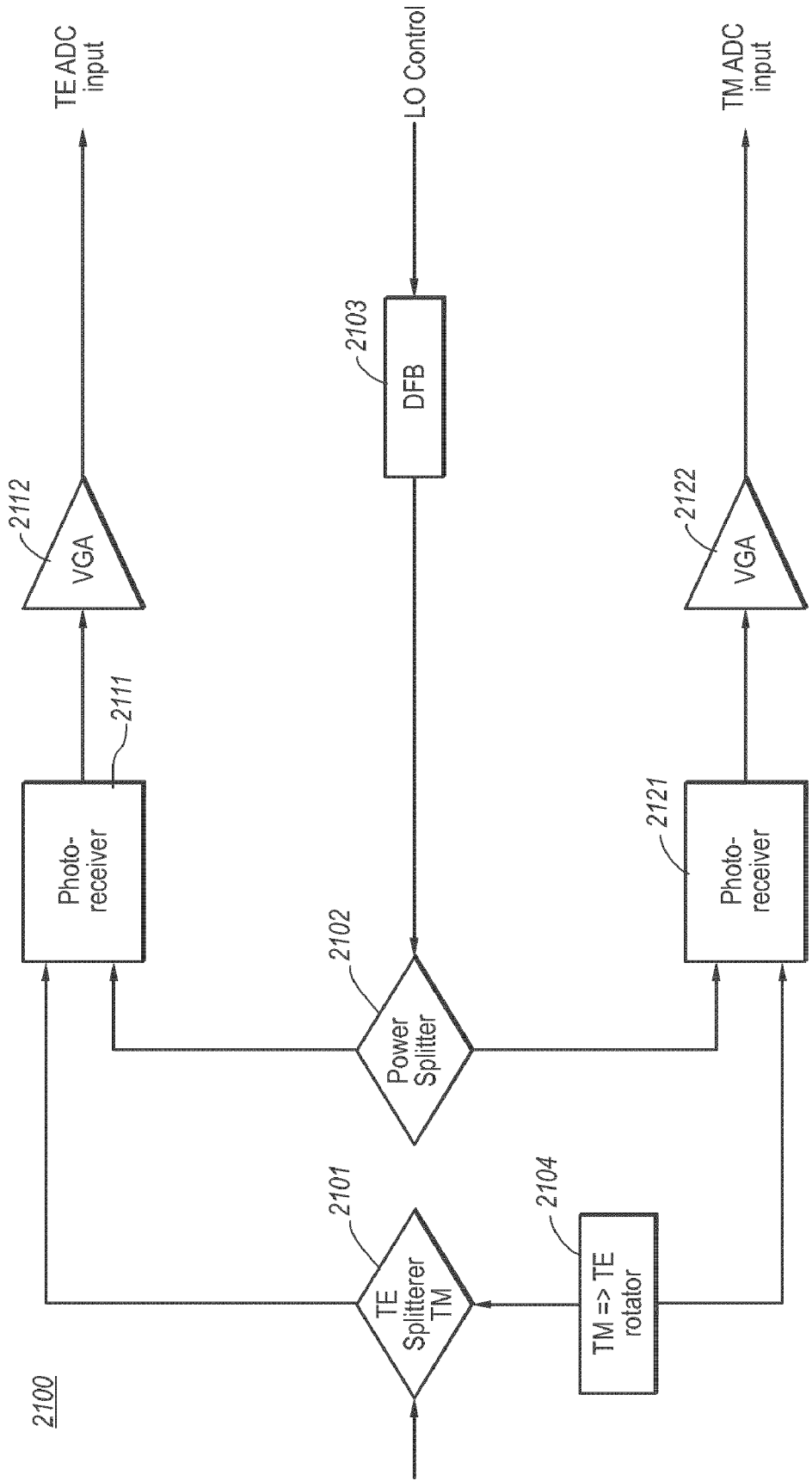
FIG. 21 illustrates an example architecture for the two-channel demodulator of FIG. 20.

FIG. 21 illustrates an example architecture 2100 for the two-channel demodulator 2001 of FIG. 20. The optical signal is received into a TE TM splitter 2101, which directs the TE polarized light into a TE branch photo-receiver 2111, and directs the TM polarized light into a TM branch photo-receiver 2121. The DFB 2103 generates a continuous waveform at the frequency controlled by the LO Control signal. Using optical power splitter 2102, portions of this continuous waveform are directed towards the TE branch photo-receiver 2111 for performing demodulation by the photo-receiver 2111, and portions of this continuous waveform are directed towards the TM branch photo-receiver 2121 for performing demodulation by the photo-receiver 2121. The resulting near zero IF signals are provided to corresponding Variable Gain Amplifiers (VGAs) 2112 and 2122 whereupon they are amplified to suitable levels for sampling by the corresponding ADCs 2002A and 2002B of FIG. 20.

Figure 22:
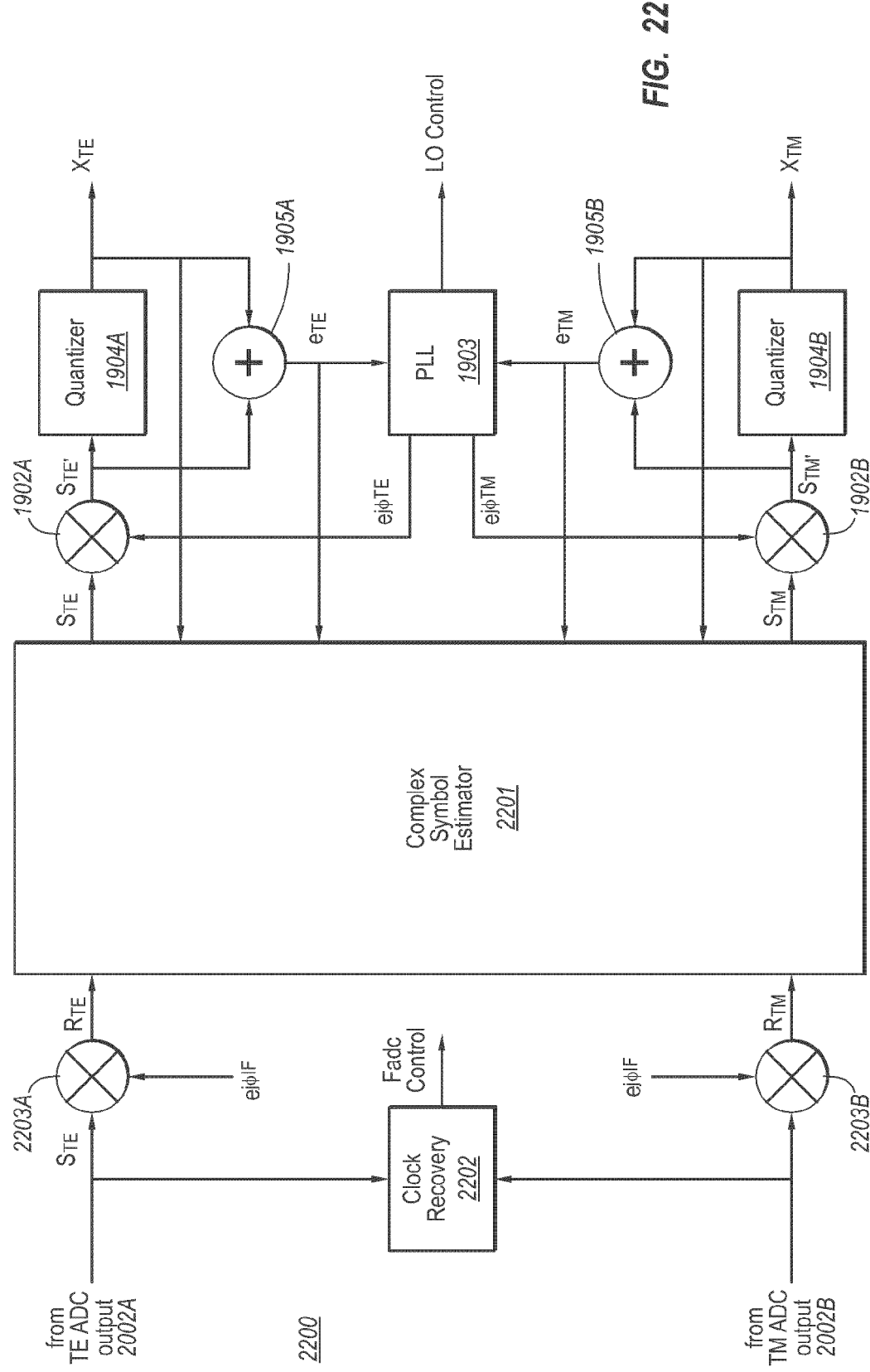
FIG. 22 illustrates an example architecture for the near-zero IF DSP of FIG. 20.

FIG. 22 illustrates an example architecture 2200 for the near-zero IF DSP 2024 of FIG. 20. The complex symbol estimator 2201, and blocks after it (i.e., 1902A, 1902B, 1903, 1904A, 1904B, 1905A and 1905B) and the corresponding signals are similar to those of the two-channel baseband DSP 1900 of FIG. 19. Prior to the complex symbol estimator 2201, there is a clock recovery circuit 2202, which generates a control word to set the frequency of the ADCs (Fadc.). This might be done by first demodulating to a baseband signal. The complex symbol estimator 2202 takes complex inputs RTE and RTM which are generated in the corresponding digital demodulators 1703A and 1703B, driven with corresponding fixed complex demodulation signals $e^{j\Phi_{IF}}$.

Figure 23:
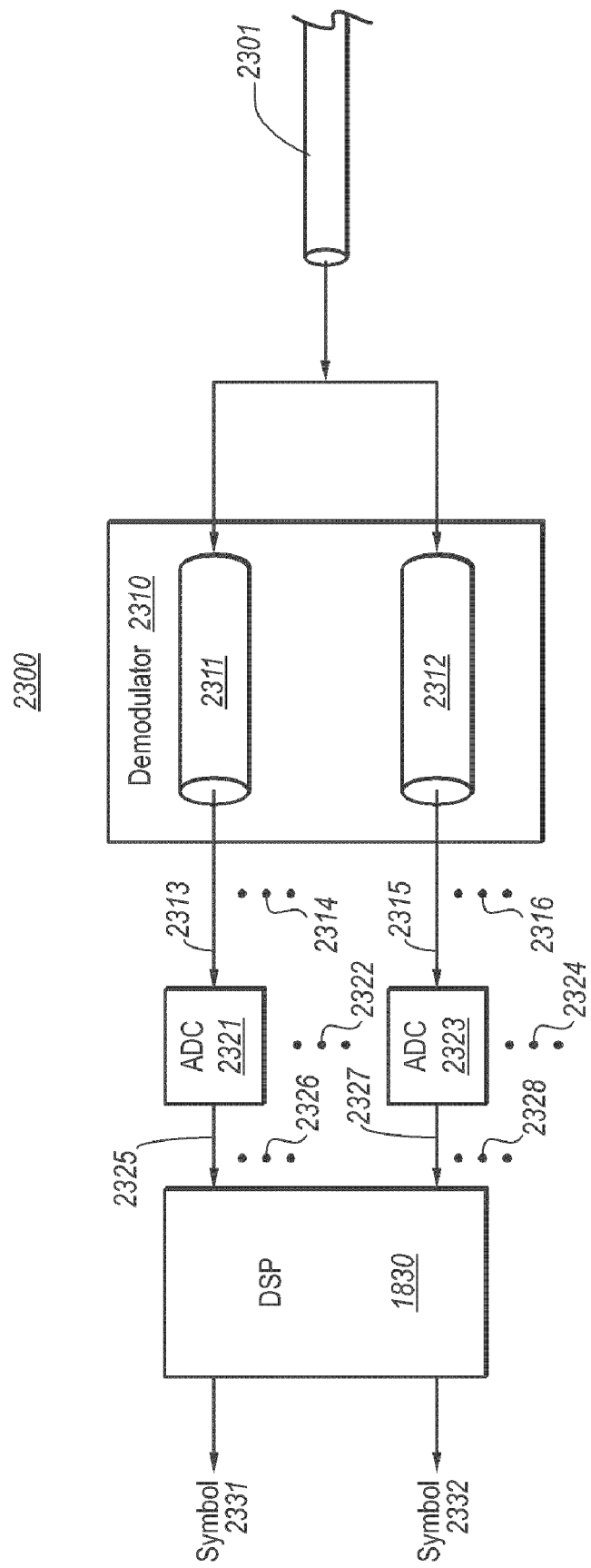
FIG. 23 illustrates a more general receiver channel architecture that may be used to demodulate dual polarization phase shift key modulated signals.

FIGS. 11 and 19-22 describe two specific implementations of the receiver channel. FIG. 23, however, describes a more general receiver channel 2300 to demonstrate that the principles of the receiver channel are not limited to the implementations described in FIGS. 11 and 19-22, but should be construed as much more general.

The receiver includes a demodulator 2310 that receives the optical signal from the optical fiber 2301. The TE polarized light may be received into the TE demodulation channel 2311, and the TM polarized light may be received in the TM demodulation channel 2312. There would just be an appropriate TE TM splitter before the demodulator 2302 to separate out the TE polarized light from the TM polarized light. In addition, a polarization rotator may be used to rotate the TM polarization to TE polarization.

The TE channel 2311 is configured to demodulate a TE polarization portion of an optical signal represent on a receive optical fiber into "m" TM signal components (where m is a positive integer). The TM demodulation channel 2312 is configured to demodulate a TM polarization portion of the optical signal represented on the receive optical fiber into "m" TM signal components. The demodulator 2001 of FIG. 20 is an example of the demodulator 2310 in which "m" is one. Specifically, the TE demodulation channel of FIG. 20 produces only one TE signal component called TE, and the TM demodulation channel produces only one TM signal component called TM. The demodulator 1122 of FIG. 11 is an example of the demodulator 2310 in which "m" is two. Specifically, in the case of FIG. 11, the TE demodulation channel produces two TE signal components called TE-I and TE-Q, and the TM demodulation channel produces two TM signal components called TM-I and TM-Q. There may also be cases in which "m" may be three or greater as well.

Accordingly, the TE demodulation channel 2311 provides at least one TE component signal as represented by signal 1813, which is converted by ADC 1821 into a corresponding digital signal 2325 that is provided to the DSP 2330. However, in the case of m being two or greater, the TE demodulation channel 2311 provides one or more other TE component signals (as represented by the ellipses 2314) to yet corresponding one or more other ADCs as represented by the ellipses 2322 to thereby generate yet other corresponding digital signal(s) (as represented by the ellipses 2326), which may also be provided to the DSP 2330.

Similarly, the TM demodulation channel 2312 provides at least one TM component signal as represented by signal 2315, which is converted by ADC 2323 into a corresponding digital signal 2327 that is provided to the DSP 2330. However, in the case of m being two or greater, the TM demodulation channel 2312 provides one or more other TM component signals (as represented by the ellipses 2316) to yet corresponding one or more other ADCs (as represented by the ellipses 2324) to thereby generate yet other corresponding digital signal(s) (as represented by the ellipses 2328), which may also be provided to the DSP 2330.

The DSP 2330 is a two times "m" channel digital signal processor configured to 1) receive the "m" digital signals provided by the "m" TE analog-to-digital converters, use the received digital signals to match against a first point in a PSK constellation plot, and output a corresponding first m-bit sequence (represented by symbol 2331), and 2) receive the "m" digital signals provided by the "m" TM analog-to-digital converters, use the received digital signals to match against a second point in the PSK constellation plot, and output a corresponding second bit sequence (represented by symbol 2331).

Accordingly, the principles described herein allow for a more flexible and feasible mechanism for performing optical transmission and reception. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical transmitter comprising:
an n-lane digital data channel configured to provide n-lanes of digital data to provide a synchronized sequence of n-bit digital data signals, one n-bit digital data signal for each discrete time in the sequence digital data signals, wherein each n-bit digital data signal has at least eight possible digital values;
an n-bit digital-to-analog converter configured to receive the sequence of n-bit digital data signals to thereby convert digital values of at least some of the n-bit digital data signals into corresponding analog data signals to thereby generate a sequence of analog data signals; and
a Phase-Shift Keyed (PSK) Chirp Managed Laser (CML)-based transmitter that is configured to receive the sequence of analog data signals, and transmit an optical signal that represents a point on a PSK constellation plot that corresponds to each analog data signal in the sequence of analog signals.

2. An optical transmitter in accordance with claim 1, wherein the PSK CML-based transmitter is a QPSK CML-based transmitter.

3. An optical transmitter in accordance with claim 1, wherein the PSK CML-based transmitter is an at least 8PSK CML-based transmitter.

4. An optical transmitter in accordance with claim 1, wherein the PSK CML-based transmitter is an at least 16 PSK CML-based transmitter.

5. An optical transmitter in accordance with claim 1, wherein the PSK CML-based transmitter uses both the In-Phase modulation and the Quadrature-Phase modulation of the PSK modulation.

6. An optical transmitter in accordance with claim 1, wherein each bit of the n-bit digital data signal is a binary bit, and n is a whole number greater than two.

7. An optical transmitter in accordance with claim 1, wherein the sequence synchronized sequence of n-bit digital data signals is a first synchronized sequence of n-bit digital data signals, and the sequence of analog data signals is a first sequence of analog data signals, the optical transmitter further comprising:
a TE polarization branch, wherein the n-lane digital data channel is a first n-lane digital data channel that is part of the TE polarization branch, the n-bit digital-to-analog converter is a first n-bit digital-to-analog converter that is part of the TE polarization branch, and the PSK CML-based transmitter is a first PSK CML-based transmitter that is part of the TE polarization branch and is configured to optical transmit TE-polarized optical signals.

8. An optical transmitter in accordance with claim 7, further comprising a TM polarization branch that comprises:
a second n-lane digital data channel configured to provide n-lanes of digital data to provide a second synchronized sequence of n-bit digital data signals;
a second n-bit digital-to-analog converter configured to convert the second sequence of n-bit digital data signals into corresponding analog data signals to thereby generate a second sequence of analog data signals; and
a second CML-based transmitter configured to receive the second sequence of analog data signals, and transmit an TM-polarized optical signal that represents a point on a PSK constellation plot that corresponds to each analog data signal in the second sequence of analog signals.

9. An optical transmitter in accordance with claim 8, wherein the optical transmitter is part of an optical transceiver, the optical transceiver further comprising:
an optical receiver comprising a four channel demodulator and a plurality of analog-to-digital converters,
wherein the four channel demodulator comprises: 1) a TM in-phase demodulation channel capable of extracting TM polarized in-phase signals from optical signals present on a receive optical fiber; 2) a TM quadrature-phase demodulation channel capable of extracting TM polarized quadrature-phase signals from optical signals present on the receive optical fiber; 3) a TE in-phase demodulation channel capable of extracting TE polarized in-phase signals from optical signals present on the receive optical fiber; and 4) a TE quadrature-phase demodulation channel capable of extracting TE polarized quadrature-phase signals from optical signals present on the receive optical fiber, wherein when an optical signal is present on an optical fiber that is inserted into the optical fiber receptacle, at least a portion of that optical signal is received into the four channel demodulator, the TM polarization portion representing a symbol sequence in which each symbol has eight or more possible values, the TE polarization portion representing a symbol sequence in which each symbol has eight or more possible values; and
wherein the plurality of analog-to-digital converters comprises: 1) a first analog-to-digital converter configured to convert the TM polarized in-phase signal into a first digital signal, 2) a second analog-to-digital converter configured to convert the TM polarized quadrature-phase signal into a second digital signal, 3) a third analog-to-digital converter configured to convert the TE polarized in-phase signal into a third digital signal, and 4) a fourth analog-to-digital converter configured to convert the TM polarized quadrature-phase signal into a fourth digital signal.

10. An optical transmitter in accordance with claim 8, wherein the optical transmitter is part of an optical transceiver, the optical transceiver further comprising:
an optical receiver comprising a demodulator, "m" TM analog-to-digital converters, and "m" TE analog-to-digital converters, wherein "m" is a positive integer;
wherein the demodulator comprises: 1) a TM demodulation channel configured demodulate a TM polarization portion of an optical signal represent on a receive optical fiber into "m" TM signal components, and 2) a TE demodulation channel configured to demodulate a TE polarization portion of the optical signal represented on the receive optical fiber into "m" TE signal components;
wherein each of the "m" TM analog-to-digital converters are configured to convert a corresponding TM signal component provided by the TM demodulation channel of the demodulator into a corresponding digital signal; and
wherein each of the "m" TE analog-to-digital converters are configured to convert a corresponding TE signal component provided by the TE demodulation channel of the demodulator into a corresponding digital signal.

11. An optical transceiver in accordance with claim 10, further comprising:
a two times "m" channel digital signal processor configured to 1) receive the "m" digital signals provided by the "m" TM analog-to-digital converters, use the received digital signals to match against a first point in a PSK constellation plot, and output a corresponding first bit sequence, and 2) receive the "m" digital signals provided by the "m" TE analog-to-digital converters, use the received digital signals to match against a second point in the PSK constellation plot, and output a corresponding second bit sequence.

12. An optical transceiver in accordance with claim 10, wherein "m" is one.

13. An optical transceiver in accordance with claim 10, wherein "m" is three or more.

14. An optical transmitter in accordance with claim 1, wherein the optical transmitter is capable of transmitting at 100 Gigabits per second.

15. An optical transmitter in accordance with claim 14, wherein the synchronized sequence of n-bit digital data signals operates at a symbol rate of less than 25 Gigasymbols per second for each lane of the digital data signal.

16. An optical transmitter in accordance with claim 14, wherein the synchronized sequence of n-bit digital data signals operates at less than 20 Gigasymboles per second for each lane of the digital data signal.

17. An optical transmitter in accordance with claim 1, wherein each point in the PSK constellation plot are equally spaced.

18. An optical transmitter in accordance with claim 17, wherein each point in the PSK constellation plot has equal magnitude.

19. An optical transmitter in accordance with claim 1, wherein each point in the constellation plot has equal magnitude.

20. An optical receiver comprising:
an optical fiber receptacle capable of receiving an optical fiber;
a four channel demodulator comprising: 1) a TM in-phase demodulation channel capable of extracting TM polarized in-phase signals from optical signals present on the optical fiber; 2) a TM quadrature-phase demodulation channel capable of extracting TM polarized quadrature-phase signals from optical signals present on the optical fiber; 3) a TE in-phase demodulation channel capable of extracting TE polarized in-phase signals from optical signals present on the optical fiber; and 4) a TE quadrature-phase demodulation channel capable of extracting TE polarized quadrature-phase signals from optical signals present on the optical fiber, wherein when an optical signal is present on an optical fiber that is inserted into the optical fiber receptacle, at least a portion of that optical signal is received into the four channel demodulator; and
a plurality of analog-to-digital converters comprising: 1) a first analog-to-digital converter configured to convert the TM polarized in-phase signal into a first digital signal, 2) a second analog-to-digital converter configured to convert the TM polarized quadrature-phase signal into a second digital signal, 3) a third analog-to-digital converter configured to convert the TE polarized in-phase signal into a third digital signal, and 4) a fourth analog-to-digital converter configured to convert the TM polarized quadrature-phase signal into a fourth digital signal,
wherein each of the plurality of analog-to-digital converters operates at a sampling rate that is less than one quarter the data rate of the optical signal present on the optical fiber.

21. The optical receiver in accordance with claim 20, further comprising:
a four channel digital signal processor configured to 1) receive the first and second digital signals, match the first combined signal of the first and second digital signals against a first point in a PSK constellation plot, and output a corresponding first bit sequence, and 2) receive the third and fourth digital signals, match the second combined signal of the third and fourth digital signals against a second point in the PSK constellation plot, and output a corresponding second bit sequence.

22. An optical receiver comprising:
an optical fiber receptacle capable of receiving an optical fiber;
a demodulator comprising: 1) a TM demodulation channel configured demodulate a TM polarization portion of an optical signal represent on the optical fiber into "m" TM signal components, and 2) a TE demodulation channel configured to demodulate a TE polarization portion of the optical signal represented on the optical fiber into "m" TE signal components, wherein "m" is a positive integer, the TM polarization portion representing a symbol sequence in which each symbol has eight or more possible values, the TE polarization portion representing a symbol sequence in which each symbol has eight or more possible values;
"m" TM analog-to-digital converters, each configured to convert a corresponding TM signal component provided by the TM demodulation channel of the demodulator into a corresponding digital signal; and
"m" TE analog-to-digital converters, each configured to convert a corresponding TE signal component provided by the TE demodulation channel of the demodulator into a corresponding digital signal.

23. An optical receiver in accordance with claim 22, further comprising:
a two times "m" channel digital signal processor configured to 1) receive the "m" digital signals provided by the "m" TM analog-to-digital converters, use the received digital signals to match against a first point in a PSK constellation plot, and output a corresponding first bit sequence, and 2) receive the "m" digital signals provided by the "m" TE analog-to-digital converters, use the received digital signals to match against a second point in the PSK constellation plot, and output a corresponding second bit sequence.

24. An optical receiver in accordance with claim 23, wherein "m" is one.

25. An optical receiver in accordance with claim 23, wherein "m" is two.

26. An optical receiver in accordance with claim 23, wherein "m" is three or greater.

* * * * *